US007343060B2

(12) United States Patent
Ohtsu et al.

(10) Patent No.: US 7,343,060 B2
(45) Date of Patent: Mar. 11, 2008

(54) LIGHT TRANSMISSION AND RECEPTION MODULE, SUB-MOUNT, AND METHOD OF MANUFACTURING THE SUB-MOUNT

(75) Inventors: Shigemi Ohtsu, Ashigarakami-gun (JP); Keishi Shimizu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 37 days.

(21) Appl. No.: 11/220,654

(22) Filed: Sep. 8, 2005

(65) Prior Publication Data

US 2006/0198569 A1    Sep. 7, 2006

(30) Foreign Application Priority Data

| Mar. 4, 2005 | (JP) | ............................. 2005-060438 |
| Mar. 18, 2005 | (JP) | ............................. 2005-080191 |
| Mar. 23, 2005 | (JP) | ............................. 2005-084914 |

(51) Int. Cl.
*G02B 6/12* (2006.01)

(52) U.S. Cl. ............................ 385/14; 385/88; 385/89; 385/129; 385/130

(58) Field of Classification Search ..................... None
See application file for complete search history.

(56) References Cited

U.S. PATENT DOCUMENTS

| 3,790,791 | A | * | 2/1974 | Anderson | ............... 250/227.24 |
| 4,592,619 | A | * | 6/1986 | Weidel | .......................... 385/14 |
| 5,375,184 | A | * | 12/1994 | Sullivan | ....................... 385/129 |
| 5,619,599 | A | * | 4/1997 | Wilson et al. | ................. 385/12 |
| 6,114,090 | A | * | 9/2000 | Wu et al. | ................. 430/281.1 |
| 6,487,224 | B1 | * | 11/2002 | Ohashi et al. | ............ 372/43.01 |
| 6,567,590 | B1 | * | 5/2003 | Okada et al. | .................. 385/49 |
| 6,721,470 | B2 | * | 4/2004 | Bosselmann et al. | ......... 385/12 |
| 6,845,184 | B1 | * | 1/2005 | Yoshimura et al. | ........... 385/14 |
| 6,901,198 | B2 | * | 5/2005 | Shimizu et al. | ............. 385/129 |
| 6,931,167 | B2 | * | 8/2005 | Ohtsu et al. | ................... 385/14 |
| 6,939,058 | B2 | * | 9/2005 | Gurevich et al. | ............. 385/93 |
| 7,029,607 | B2 | * | 4/2006 | Shimizu et al. | ............. 264/1.25 |
| 2001/0010744 | A1 | * | 8/2001 | Shuto et al. | .................. 385/92 |

(Continued)

FOREIGN PATENT DOCUMENTS

| JP | A 2000-39530 | 2/2000 |
| JP | A 2000-39531 | 2/2000 |
| JP | A 2000-114655 | 4/2000 |
| JP | A 2000-235127 | 8/2000 |
| JP | A 2004-29507 | 1/2004 |
| JP | A 2004-86144 | 3/2004 |

(Continued)

*Primary Examiner*—Sung Pak
*Assistant Examiner*—Chad H Smith
(74) *Attorney, Agent, or Firm*—Oliff & Berridge, PLC

(57) ABSTRACT

A light transmission and reception module includes: a belt-shaped macromolecular optical waveguide film having an optical waveguide, an optical transmitter having a light emitting element and a first sub-mount for holding the light emitting element, for holding one end of the macromolecular optical waveguide film on the first sub-mount so that a light emitted from the light emitting element may be coupled to an incident end surface of the optical waveguide, and an optical receiver having a light detecting element and a second sub-mount for holding the light detecting element, for holding the other end of the macromolecular optical waveguide film on the second sub-mount so that the light emitted from an exit end surface of the optical waveguide may be received in the light detecting element.

29 Claims, 15 Drawing Sheets

U.S. PATENT DOCUMENTS

| | | | |
|---|---|---|---|
| 2002/0076169 A1* | 6/2002 | Lin et al. | 385/88 |
| 2002/0181882 A1* | 12/2002 | Hibbs-Brenner et al. | 385/52 |
| 2003/0039455 A1* | 2/2003 | Ouchi | 385/88 |
| 2004/0008952 A1* | 1/2004 | Kragl | 385/88 |
| 2004/0037530 A1* | 2/2004 | Ohtsu et al. | 385/129 |
| 2004/0057689 A1* | 3/2004 | Shimizu et al. | 385/129 |
| 2004/0101230 A1* | 5/2004 | Philebrown | 385/15 |
| 2005/0053336 A1* | 3/2005 | Ito et al. | 385/89 |
| 2006/0120666 A1* | 6/2006 | Ohtorii | 385/33 |

FOREIGN PATENT DOCUMENTS

| | | |
|---|---|---|
| JP | A 2004-109927 | 4/2004 |
| JP | A 2004-139041 | 5/2004 |

* cited by examiner

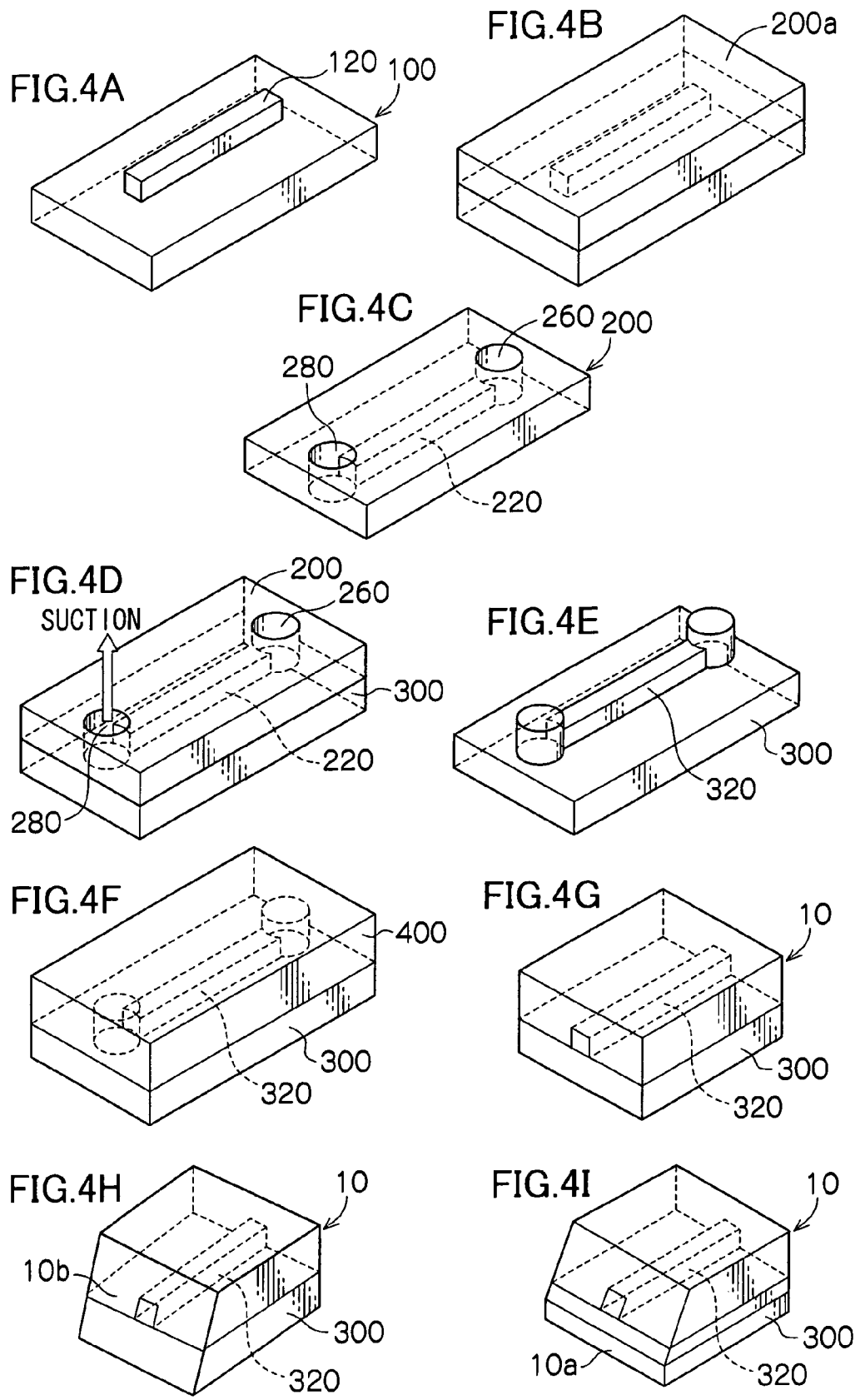

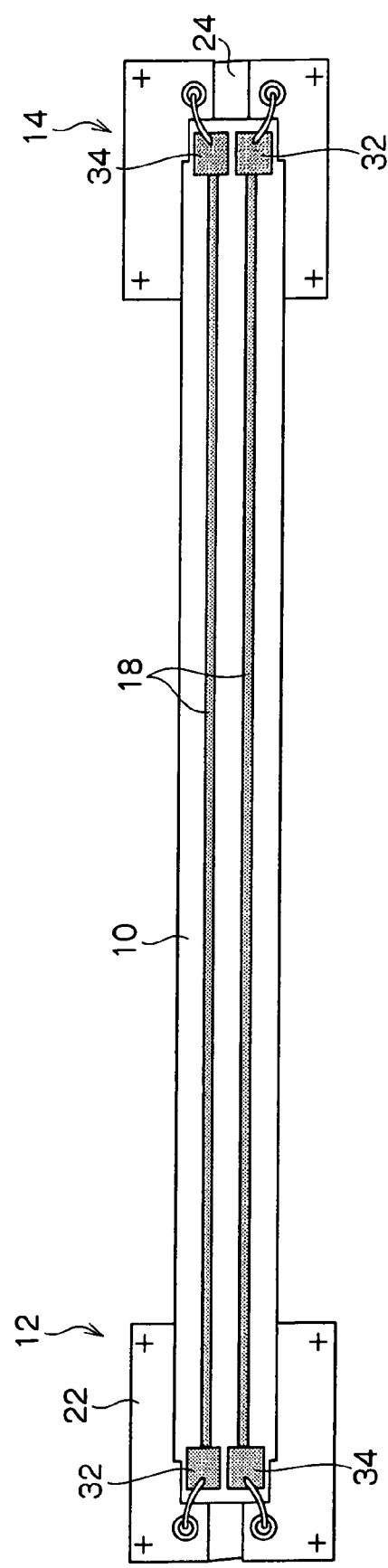

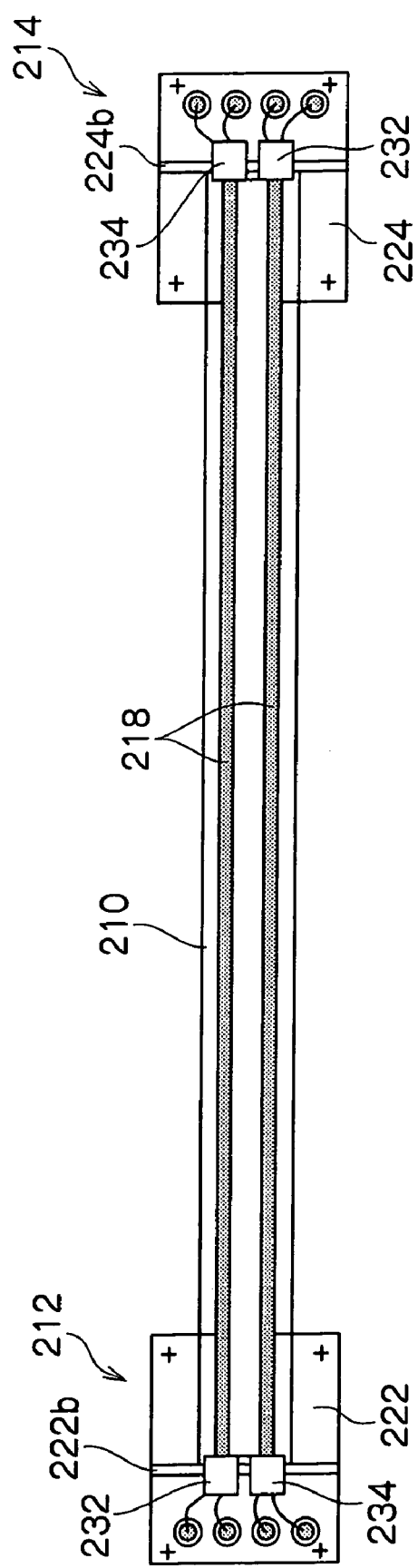

LIGHT TRANSMISSION AND RECEPTION MODULE, SUB-MOUNT, AND METHOD OF MANUFACTURING THE SUB-MOUNT

CROSS-REFERENCE TO RELATED APPLICATION

This application claims priority under 35 USC 119 from Japanese Patent Applications Nos. 2005-60438, 2005-80191 and 2005-84914, the disclosures of which are incorporated by reference herein.

BACKGROUND OF THE INVENTION

1. Field of the Invention

The present invention relates to a light transmission and reception module, and more particularly to a light transmission and reception module for transmitting and receiving an optical signal by way of an optical waveguide formed on a macromolecular optical waveguide film. The invention also relates to a sub-mount used in this light transmission and reception module, and a method of manufacturing the same sub-mount.

2. Description of the Related Art

Hitherto, various methods of manufacturing a macromolecular optical waveguide have been proposed, including (1) a method of impregnating a film with a monomer, exposing the core selectively to change the refractive index thereof, and effecting attachment of the film (selective polymerization method), (2) a method of providing a core layer and a clad layer by coating, and forming the clad by reactive ion etching (RIE method), (3) a method of using photolithography, in which exposure and development are effected by using an infrared curable resin obtained by adding a photosensitive material to a macromolecular material (direct exposure method), (4) a method of injection molding, and (5) a method of providing a core layer and a clad layer by coating, and exposing the core to change the refractive index of the core (photo bleaching method).

However, in the selective polymerization method (1), there are problems in adhesion of the film. In the methods (2) and (3), the cost is high because of photolithography. The method of (4) has problems in precision of the obtained core diameter. In the method of (5), a sufficient difference in refractive index is not obtained between the core layer and clad layer.

Excellent and practical methods from the viewpoint of performance are the methods (2) and (3) only, but they are costly. Further, any one of the methods (1) to (5) is not applicable to formation of macromolecular optical waveguide in a wide and flexible plastic substrate.

By contrast, the present inventors have previously proposed a method of manufacturing a macromolecular optical waveguide by using a mold (specifically, by what is called "micro-mold method"), which method is completely different from the conventional methods of manufacturing a macromolecular optical waveguide (see Japanese Patent Application Laid-open Nos. 2004-29507, 2004-86144, and 2004-109927).

According to this method, mass production of macromolecular optical waveguides is possible very easily and at low cost. In spite of the easy method, a macromolecular optical waveguide with a small waveguide loss can be formed, and any pattern can be formed easily as far as a mold can be made. It is further possible to form an optical waveguide on a hitherto difficult flexible plastic substrate.

Recently, in the IC technology or LSI technology, in order to enhance the operating speed and degree of integration, it has been proposed to form optical wiring between devices, between boards in device, or in chips, instead of placing electrical wiring at high density. Various devices are proposed for optical winding using surface emission type laser and surface photo detectors such as photo diodes advantageous for saving energy and forming surface arrays.

As such device, Japanese Patent Application Laid-open No. 2000-39530 discloses an optical device comprising a core, a macromolecular optical waveguide having a clad for enveloping the core, a photo transmitter and a photo detector disposed in the laminating direction of core and clad, an incident surface mirror for receiving the light from the light emitting element and making the light be incident on the core, and an exit surface mirror for emitting the light from the core to the photo detector, in which the clad layer is formed in a concave shape at a position corresponding to the optical path reaching from the photo emitter to the incident surface mirror and from the exit surface mirror to the photo detector, and the light from the light emitting element and the light from the exit surface mirror are converged.

Japanese Patent Application Laid-open No. 2000-39531 discloses an optical device for making the light from a light emitting element be incident on the core end surface of a macromolecular optical waveguide having a core and a clad for enveloping the core, in which the light incident end surface of the core is formed in a convex shape toward the light emitting element, and the light from the light emitting element is converged to suppress the waveguide loss.

Japanese Patent Application Laid-open No. 2000-235127 discloses a photoelectronic integrated circuit in which a macromolecular optical waveguide circuit is directly assembled on an integrated photoelectric fusion circuit board of electronic element and optical element.

In any one of these methods of optical wiring proposed so far, the optical waveguide is fixed on the substrate together with the light emitting and detecting elements and the mirrors, and as compared with electrical wiring, the degree of freedom of wiring is smaller, and it can be hardly applied in narrow and plaited wiring of cellphones, slim personal computers, and mobile appliances.

On the other hand, a flat optical fiber tape bundling several strands of resin-coated optical fibers is used in optical wiring, but the optical fiber is made of quartz glass tube and is not resistant to bending and folding, and the degree of freedom of wiring is also small.

In addition to these problems, in the methods of manufacturing a macromolecular optical waveguide proposed so far, it is required to bury a mirror in order to form a 90-degree folding mirror, or positioning at high precision is required in the case of adhering a waveguide and light emitting and detecting elements, whereby the mounting cost is high.

By contrast, the present inventors have previously invented a macromolecular optical waveguide module with light emitting and detecting elements having a macromolecular optical waveguide film including the optical waveguide duplicated by a mold, and already filed an application therefor (Japanese Patent Application Laid-open No. 2004-139041). In this macromolecular optical waveguide film, an optical path conversion mirror surface and abutting surface are provided on a same end. An abutting surface at which an abutting surface of a film is abutted is formed in a submount holding the light receiving-detecting element. In this module, when mounting, the abutting surface of the film is abutted to the abutting surface formed on the sub-mount, and the light emitting and detecting elements and optical path conversion surface can be positioned precisely and easily.

Japanese Patent Application Laid-open No. 2000-114655 discloses a semiconductor laser device for converting the optical path of laser beam by a mirror surface by forming the mirror surface on the sub-mount of semiconductor laser.

For the precise processing of such sub-mount, however, each submount must be processed by fine processing technology such as reactive ion etching (RIE), and the manufacturing cost of the sub-mount becomes very high.

SUMMARY OF THE INVENTION

The present invention is devised to solve these problems, and it is hence an object thereof to present a light transmission and reception module capable of transmitting and receiving an optical signal through an optical waveguide formed in a macromolecular optical waveguide film, even in a deformed state, using a flexible belt-shaped macromolecular optical waveguide film capable of following up deformation such as folding, bending and twisting.

The invention also presents a method of manufacturing a sub-mount capable of mass-producing precise sub-mounts at low cost.

The invention further presents an inexpensive and precise sub-mount excellent in mass producibility.

The invention moreover presents a light transmission and reception module of excellent mass producibility and low cost, capable of mounting easily and reliably, by using an inexpensive and precise sub-mount excellent in mass producibility.

A first aspect of the invention presents a light transmission and reception module comprising: a belt-shaped macromolecular optical waveguide film forming an optical waveguide; an optical transmitter having a light emitting element and a sub-mount for holding the light emitting element, for holding one end of the macromolecular optical waveguide film on the sub-mount so that the light emitted from the light emitting element may be coupled to the incident end surface of the optical waveguide; and an optical receiver having a light detecting element and a sub-mount for holding the light detecting element, for holding other end of the macromolecular optical waveguide film on the sub-mount so that the light emitted from the exit end surface of the optical waveguide may be received by the light detecting element.

In the light transmission and reception module according to this aspect, one end of the macromolecular optical waveguide film is held on the sub-mount of the optical transmitter, and the light emitted from the light emitting element held on the sub-mount is coupled to the incident end surface of the optical waveguide and guided along the optical waveguide formed in the macromolecular optical waveguide film. On the other hand, on the sub-mount of the optical receiver, the other end of the macromolecular optical waveguide film is held, and the light emitted from the exit end surface of the optical waveguide is received by the light detecting element held on the sub-mount.

In this light transmission and reception module, since the flexible belt-shaped macromolecular optical waveguide film is capable of following up deformation such as bending, folding and twisting, if the film is deformed, the optical signal can be transmitted and received through the optical waveguide formed on the macromolecular optical waveguide film.

A second aspect of the invention presents a light transmission and reception module comprising: a belt-shaped macromolecular optical waveguide film forming an optical waveguide; an optical transmitter having a sub-mount forming a reflection plane for converting an optical path of incident light and a light emitting element, for mounting one end of the macromolecular optical waveguide film on the sub-mount, and disposing the light emitting element so that the light emitted from the light emitting element has an optical path thereof changed by the reflection plane and coupled to the incident end surface of the optical waveguide; and an optical receiver having a sub-mount forming a reflection plane for converting an optical path of incident light and a light detecting element, for mounting other end of the macromolecular optical waveguide film on the sub-mount, and disposing the light detecting element so that the light emitted from the exit end surface of the optical waveguide has an optical path thereof changed by the reflection plane and received in the light detecting element.

In the light transmission and reception module according to this aspect, the sub-mount of the optical transmitter and optical receiver has a reflection plane for converting the optical path of incident light. One end of the macromolecular optical waveguide film is mounted on the sub-mount of the optical transmitter. The light emitted from the light emitting element disposed at a specified position of the optical transmitter has an optical path thereof changed by the reflection plane, coupled to the incident end surface of the optical waveguide, and guided in the optical waveguide formed on the macromolecular optical waveguide film.

On the other hand, on the sub-mount of the optical receiver, other end of the macromolecular optical waveguide film is mounted, and the light emitted from the exit end surface of the optical waveguide has an optical path thereof changed by the reflection plane, and is received in the light detecting element disposed at specified position of the optical receiver.

A third aspect of the invention presents a method of manufacturing a sub-mount comprising the steps of: producing a mold having projection and recess patterns formed thereon for copying the surface configuration of a sub-mount; filling the produced mold with a curing material; curing the applied curing material; and removing the copied or produced sub-mount from the mold to manufacture a sub-mount.

In the method of manufacturing a sub-mount according to this aspect, since the mold is filled with a curing material and the applied curing material is cured to copy a sub-mount, the sub-mount can be mass-produced at low cost. Besides, since the mold has projection and recess patterns formed thereon for copying the surface configuration of the sub-mount, a precise sub-mount can be copied with high accuracy.

Methods of producing a mold include a method of curing liquid silicone rubber on the master plate of sub-mount, a method of etching a silicon substrate, and a method of casting a metal.

The sub-mount obtained in this method is excellent in mass production, inexpensive, and precise. Additionally, the light transmission and reception module manufactured by using this sub-mount can be mounted easily and reliably, and is excellent in mass production and lost in cost.

As explained herein, according to the invention, by using the flexible belt-shaped macromolecular optical wavelength film capable of following up deformation such as bending, folding or twisting, if the film is deformed, an optical signal can be transmitted or received through the optical waveguide formed on the macromolecular optical waveguide film.

Also according to the invention, precise sub-mounts can be mass-produced at low cost. That is, the sub-mount of the invention is excellent in mass producibility, inexpensive, and precise, and the light transmission and reception module of the invention can be mounted easily and reliably, and is excellent in mass producibility and low in cost.

BRIEF DESCRIPTION OF THE DRAWINGS

FIGS. 4A to 4I are diagrams showing manufacturing process of the macromolecular optical waveguide film.

FIG. 7 is a schematic diagram of configuration of light transmission and reception module in the first embodiment.

FIG. 13 is a schematic diagram of configuration of light transmission and reception module in the second embodiment.

DETAILED DESCRIPTION OF THE INVENTION

First Embodiment

Figure 1:
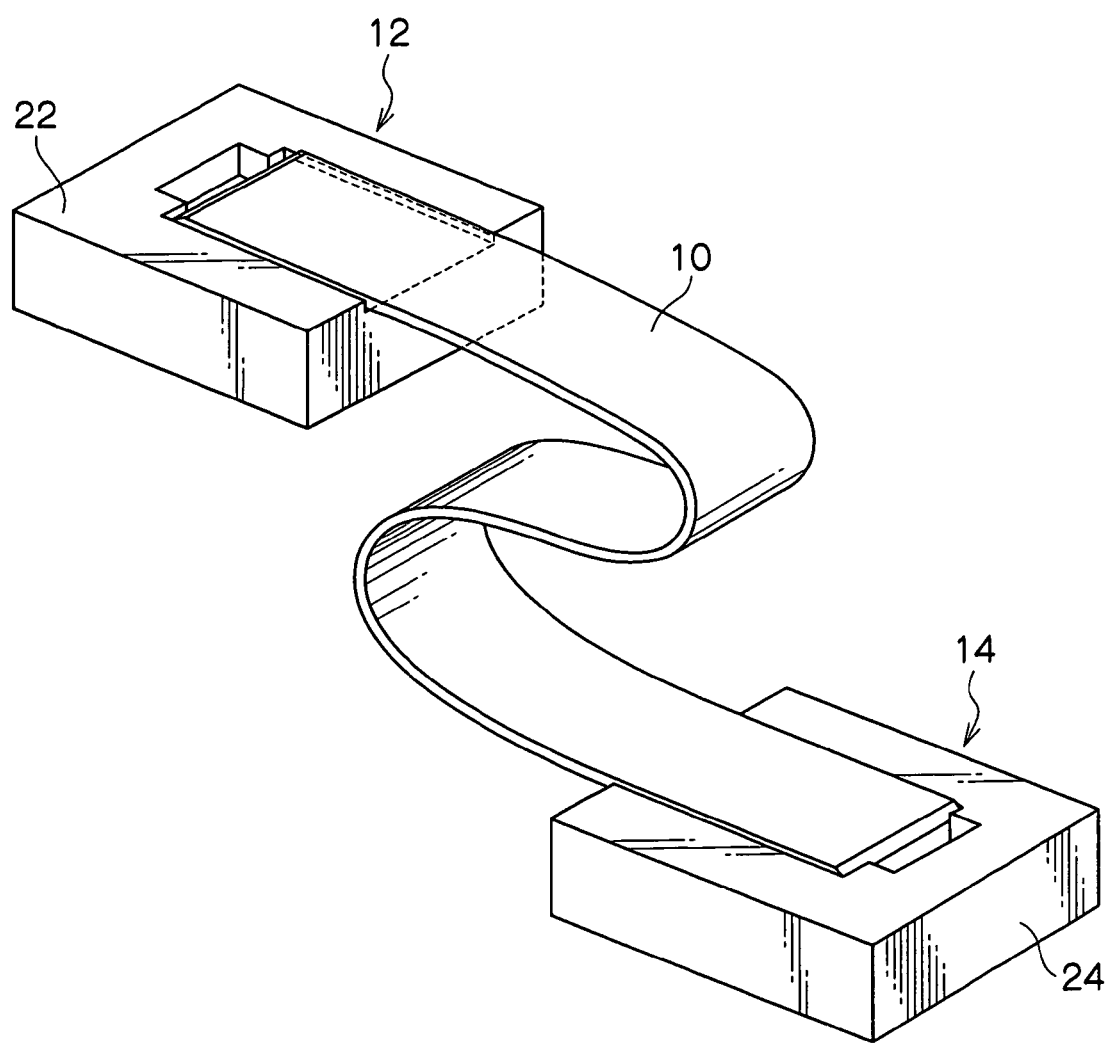
FIG. 1 is a schematic structural diagram of light transmission and reception module in first embodiment of the invention.

With referring to the drawings, a first embodiment of the present invention is specifically described below.

[Light Transmission and Reception Module]

FIG. 1 is a schematic structural diagram of light transmission and reception module in the first embodiment. This light transmission and reception module is composed of, as shown in FIG. 1, a belt-shaped macromolecular optical waveguide film 10, and optical transmission and reception sections 12, 14 for transmitting and receiving an optical signal through an optical waveguide formed in the macromolecular optical waveguide film 10.

The optical transmitter 12 has a sub-mount 22, and one end of the macromolecular optical waveguide film 10 is held on the sub-mount. The optical transmission and reception section 14 has a sub-mount 24, and other end of the macromolecular optical waveguide film 10 is held on the sub-mount 24.

Figure 2B:
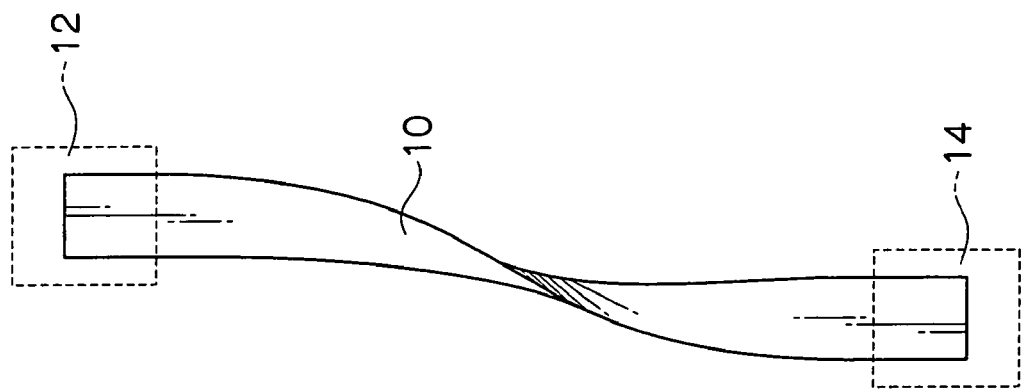
FIG. 2B is a diagram showing deformation-follow-up characteristic of light transmission and reception module in first embodiment.
Figure 2A:
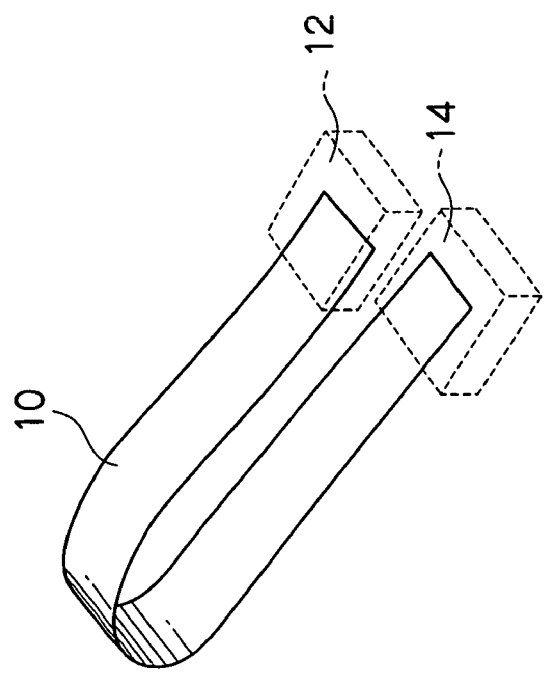
FIG. 2A is a diagram showing deformation-follow-up characteristic of light transmission and reception module in first embodiment.

The macromolecular optical waveguide film 10 is composed of a flexible transparent resin film, and is capable of following up deformation such as bending, folding or twisting as shown in FIG. 2A and FIG. 2B. Accordingly, if the film is deformed, the optical signal transmitted from the optical transmission and reception section 12 can be received in the optical transmission and reception section 14, as being guided through the optical waveguide formed in the macromolecular optical waveguide film 10.

Preferably, the macromolecular optical waveguide film 10 should have a flexibility of radius of curvature of 3 mm or less. The bending radius is a value expressing the length of the radius of a circle, obtained by approximating a small portion of a curve formed inside of the film when the film is folded, to be a circle, and its tolerance is measured according to the method specified in ASTM D-2176. The resin material for macromolecular optical waveguide film 10 is described later.

The macromolecular optical waveguide film 10 is preferred to have a thickness in a range of 50 µm to 300 µm in order to enhance the follow-up property to deformation, and a more preferable range is 100 µm to 200 µm. For the same reason, the width of the film is preferred to be in a range of 0.5 mm to 10 mm, or more preferably 1 mm to 5 mm.

[Macromolecular Optical Waveguide Film]

Figure 3A:
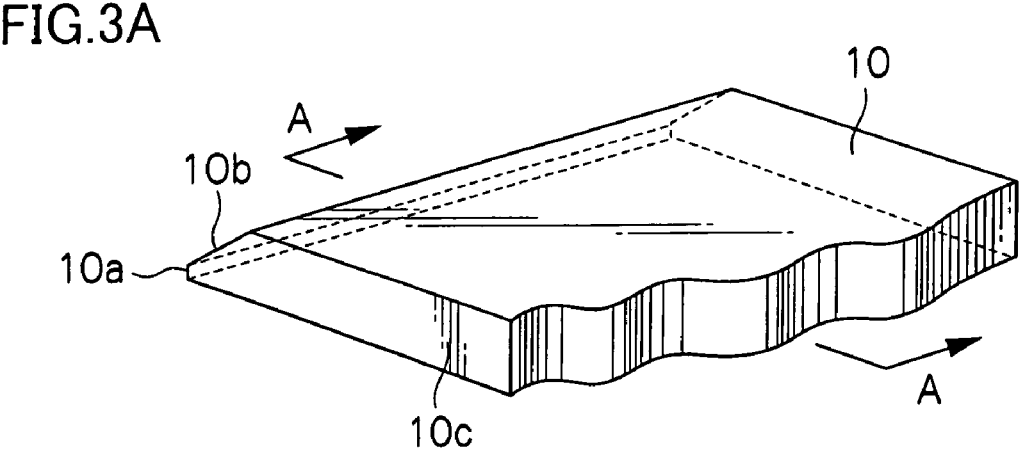
FIG. 3A is a perspective view of end portion of macromolecular optical waveguide film in first embodiment.
Figure 3B:
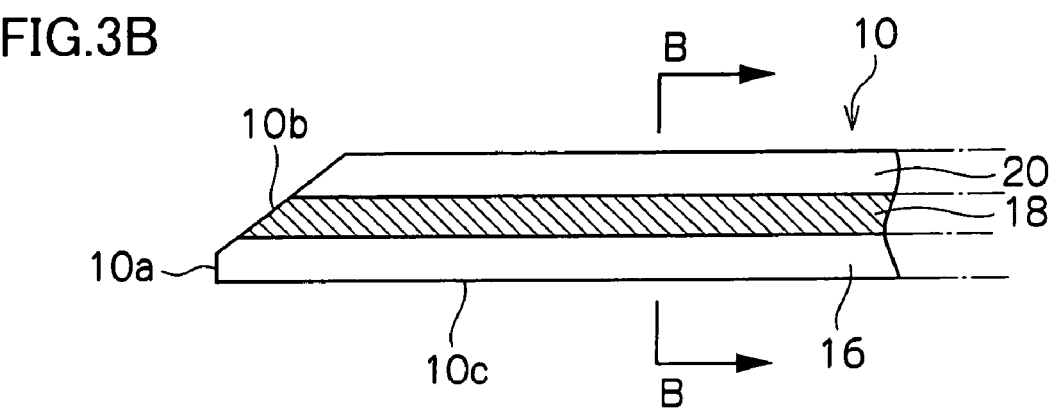
FIG. 3B is a sectional view taken along A-A of FIG. 3A.
Figure 3C:
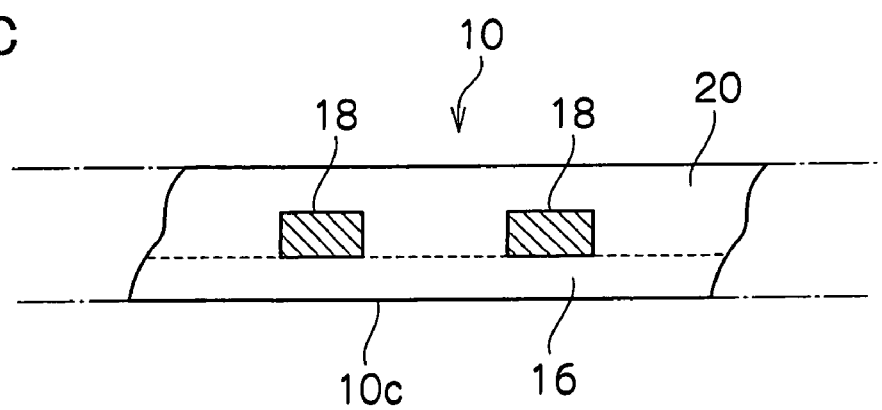
FIG. 3C is a sectional view taken along B-B of FIG. 3A.

With referring to FIGS. 3A to 3C, the configuration of macromolecular optical waveguide film 10 will be described. FIG. 3A is a perspective view of end portion of macromolecular optical waveguide film 10, FIG. 3B is a sectional view of A-A (section along optical axis of optical waveguide) of FIG. 3A, and FIG. 3C is a sectional view of B-B of FIG. 3A.

As shown in the drawing, the macromolecular optical waveguide film 10 is composed of a square core 18 extending in film length direction, and clads 16, 20 surrounding this core 18. In the macromolecular optical waveguide film 10, plural cores 18 are disposed parallel in the film width direction, and plural optical waveguides are formed in the film. In this example, two optical waveguides are formed in the film 10.

At the end of the macromolecular optical waveguide film 10, a mirror 10b is disposed at an angle of 45 degrees to the optical axis of optical waveguide. The mirror 10b functions as optical path converter for converting the optical path of the light guided in the optical waveguide. That is, the light guided in the optical waveguide has an optical path thereof changed by 90 degrees on the mirror 10b, and is emitted from the film side 10c of the light incident and exit surface.

The leading end of the clad 16 forming the mirror 10b is cut off, and an abutting surface 10a orthogonal to the optical axis of optical waveguide is formed. The abutting surface 10a is a surface abutting against the sub-mount, and is utilized in positioning on the sub-mount at the time of mounting.

This macromolecular optical waveguide film 10 can be manufactured, for example, in the following steps (1) to (6): (1) a step of preparing a mold formed of a cured layer of curable resin for forming a mold, having a recess corresponding to optical waveguide core projecting portion, and two or more through-holes penetrating through one end and other end of the recess, (2) a step of adhering a plastic film base material for clad capable of contacting tightly with the mold, tightly to the mold, (3) a step of filling a through-hole at one end of the recess of the mold adhered to the plastic film base material for clad, with a curable resin for forming a core, and filling the recess of the mold with the curable resin for forming a core by evacuating and sucking from a through-hole at other end of the recess of the mold, (4) a step of curing the filled curable resin for forming a core, and separating the mold from the plastic film base material for clad, (5) a step of forming a clad layer on the plastic film base material for clad on which the core is formed, and (6) a step of forming a 45-degree mirror and an abutting surface at the end of the obtained macromolecular optical waveguide film.

This manufacturing process of macromolecular optical waveguide film is more specifically described by referring to FIGS. 4A to 4I. For the sake of simplicity of explanation, it is supposed that only one optical waveguide is provided.

FIG. 4A shows a master plate 100, and reference numeral 120 is a projecting portion corresponding to the core of the optical waveguide. On the projecting portion forming side of the master plate 100, a curable resin for forming a mold is coated or poured thereon, and cured (see FIG. 4B). In FIG. 4B, reference numeral 200a is a cured resin layer. Later, when the cured resin layer 200a is peeled off, a cured resin layer 200a forming a recess is obtained (not shown). On the cured resin layer 200a having the recess 220, through-holes 260 and 280 communicating with the recess 220 are formed by punching the both ends of the recess, and a mold 200 (see FIG. 4C) is obtained.

As shown in FIG. 4D, a plastic film base material for clad 300 is adhered to the mold. A curable resin for forming a core is poured into a through-hole 260 formed in the mold, and the core recess 220 is filled with the curable resin for forming a core by evacuating and sucking from a through-hole 280 at other end. The resin is cured, and the mold is parted, and a core 320 is formed on the plastic film base material for clad 300 as shown in FIG. 4E.

Forming a clad (upper clad layer) 400 (see FIG. 4F), the resin portion cured inside the through-holes 260 and 280 is cut off by a dicer or the like, and a macromolecular optical waveguide film 10 is obtained (see FIG. 4G).

Finally, using a dicing saw having a 45-degree angle blade, the end of the macromolecular optical waveguide film 10 is diced, and a 45-degree mirror 10b is formed at the end of the macromolecular optical waveguide film 10 (see FIG. 4H). Further, using the dicing saw, the leading end of the 45-degree mirror is cut off at right angle with respect to the longitudinal direction of macromolecular optical waveguide film by a specified length including only the clad portion, whereby an abutting surface 10a is formed (see FIG. 4I).

The each step of forming the macromolecular optical waveguide film 10 is specifically explained below.

1) A step of preparing a mold formed from a cured layer of curable resin for forming a mold, having a recess corresponding to optical waveguide core projecting portion, and two or more through-holes penetrating through one end and other end of the recess, respectively.

Preferably, the mold should be prepared by using a master plate having a projecting portion corresponding to the optical waveguide core, but it is not limited to this. A method of using a master plate is explained below.

<Production of Master Plate>

To produce a master plate having a projecting portion corresponding to the optical waveguide core, a conventional method, for example, photolithography can be used without any limitation. Also the method previously proposed by the present applicant for producing a macromolecular optical waveguide by electrodeposition or photoelectrodeposition (Japanese Patent Application No. 2002-10240) is also applicable for production of a master plate.

The size of recess corresponding to the optical waveguide formed in the master plate is determined properly depending on the application of the macromolecular optical waveguide. For example, in the case of optical waveguide for single mode, a core of about 10 µm square is generally used, or the in case of optical waveguide for multimode, a core of about 50 to 100 µm square is used, and depending on the applications, an optical waveguide having much larger core of about hundreds of µm may be used.

<Production of Mold>

As an example of production of mold, there is a method in which a layer of curable resin for forming a mold is formed on the projecting portion forming surface of the master plate produced as mentioned above by applying or pouring the curable resin for forming a mold thereon, and the layer is dried and cured as required, then the cured resin layer is separated from the master plate, and a die having a recess corresponding to the projecting portion is formed, and through-holes each communicating with one end and other end of the recess are formed in the die. The through-holes can be formed by punching the die in a specified shape. If the through-holes are formed by punching, the contact tightness between the mold and the film base material for clad is excellent, and no gap to the film base material for clad is formed except for the recess of the mold, so that the curable resin for forming a core will not permeate into other portion than the recess.

The thickness of the die (resin cured layer) is properly determined in consideration of handling performance of the mold, but generally it is suitably set to be about 0.1 to 50 mm. Preferably, the master plate should be preliminarily coated with releasing agent or the like to facilitate releasing from the mold.

The through-hole provided at the supply side of the curable resin for core functions as a reservoir for liquid (curable resin for forming a core). The through-hole provided at the discharge side of the curable resin for forming a core is used for evacuation and suction for evacuating the recess of the mold when the mold is filled with the curable resin. The shape and size of supply side through-hole are not particularly specified as far as the through-hole communicates with the supply side of the recess and functions as a liquid reservoir. The shape and size of discharge side through-hole are not particularly limited as long as the through-hole communicates with the discharge end of the recess and can be used for evacuating and sucking.

The through-hole provided at the supply side of the curable resin for core of the recess of the mold functions as liquid reservoir. Therefore, if its section is formed to be made larger at the side contacting with the base material for clad and smaller as away from the base material, when the mold is in contact with the film base material for clad, it is easier to separate the mold and base material after filling the recess with the curable resin for forming a core and curing. In the through-hole provided at the discharge side of the curable resin for forming a core, such liquid reservoir function is not required, and the sectional configuration is not particularly specified.

As other example of producing the mold, the master plate is provided not only with a projecting portion corresponding to the optical waveguide core, but also with a projecting portion for forming a through-hole (the height of this projecting portion is higher than the thickness of the cured layer of curable resin for forming a mold), and a curable resin for forming a mold is applied to the master plate so that the projecting portion for forming the through-hole pokes through the resin layer, and the resin layer is cured, and the cured resin layer is separated from the master plate.

The curable resin for forming a mold used for production of mold is required to have appropriate properties, including ease of peeling of the cured matter from the master plate, sufficient mechanical strength and dimensional stability as mold (to be used repeatedly), stiffness (hardness) for retaining the recess shape, and adhesion to the film base material for clad. As required, various additives may be added to the curable resin for forming a mold.

The curable resin for forming a mold can be applied or poured to the surface of the master plate, and is required to copy accurately the projecting portions corresponding to the individual optical waveguide cores formed on the master plate. Therefore, it is preferred to have viscosity below a certain limit, for example, about 500 to 7000 mPa.s. (The curable resin for forming a mold used in the invention includes a material becoming elastic rubber like body after curing.) For control of viscosity, a solvent may be added slightly so as not to cause adverse effects of the solvent.

As the curable resin for forming a mold, a curable organopolysiloxane, which becomes silicone rubber (silicone elastomer) or silicon resin after curing is preferably used from the viewpoint of releasing properly, mechanical strength and dimensional stability, hardness and adhesion with base material for clad as stated above. The curing organopolysiloxane is preferred to contain methyl siloxane group, ethylene siloxane group, or phenyl siloxane group in its molecule.

The curing organopolysiloxane may be either one-pack type or two-pack type to be used together with hardener, or may be either hot curing type or cold curing type (for example, cured by moisture in air). Or, other hardener (ultraviolet curing agent) may be also used.

The curable organopolysiloxane is preferred to become silicone rubber after curing, and usually so-called liquid silicone rubber is used (the term "liquid" includes paste or highly viscous substances herein). The two-pack type to be used together with hardener is preferred, and above all, the addition type liquid silicone rubber is especially preferred because it is cured in short time uniformly both on surface and inside thereof, free from byproducts or produce few byproducts, and excellent in releasing property and small in shrinkage rate.

Among liquid type silicone rubbers, liquid dimethyl cyclohexane is particularly preferable from the viewpoint of adhesion, separation, strength and hardness. The cured substance of liquid dimethyl cyclohexane rubber is generally low in refractive index, about 1.43, and the mold made from this substance can be preferably used as clad layer directly, which does not cause separation from the base material for clad. In this case, it is required to have proper means for prevent peeling of applied core forming resin and base material for clad from the mold.

The viscosity of liquid silicone rubber is preferably about 500 to 7000 mPa.s, or more preferably about 2000 to 5000 mPa.s, from the viewpoint of accurate copying of projecting portion corresponding to the optical waveguide core, ease of defoaming by limiting entry of foams, and obtaining mold size of several millimeters in thickness.

Surface energy of mold is 10 dyn/cm to 30 dyn/cm, preferably 15 dyn/cm to 24 dyn/cm, from the viewpoint of adhesion with base material film. Surface energy is measured by a technique of measuring critical surface tension by Zisman's method.

Share rubber hardness of mold is 15 to 80, preferably 20 to 60, from the viewpoint of die patterning performance, retaining of recessed shape and releasing property. Share rubber hardness can be measured by using durometer, conforming to JIS K 6253.

Surface roughness of mold (arithmetic average roughness Ra) is 0.2 µm or less, preferably 0.1 µm or less, from the viewpoint of die patterning performance. Arithmetic average roughness can be measured according to JIS B 0601.

The mold is preferred to be light transmittable in ultraviolet ray region and/or visible ray region. The mold is preferred to be light transmittable in visible ray region because positioning is easier when adhering the mold to the film base material for clad at step 2) below, and filling of mold recess with curable resin for forming a core can be observed at step 3) so that completion of filling can be easily known.

The mold is preferred to be light transmittable in ultraviolet ray region because ultraviolet curing is to be achieved by transmitting ultraviolet through the mold when ultraviolet curable resin is used as the curable resin for forming a core. Preferably, the transmittance of the mold in ultraviolet ray region (250 nm to 400 nm) is 80% or more.

The curable organopolysiloxane, in particular, liquid silicone rubber which becomes silicone rubber after curing is excellent in both of the contradictory properties of adhesion and separation of the film base material for clad, and has a capability of copying nano configuration, and also works to prevent entry of liquid when silicone rubber and clad base material are adhered.

As the mold using such silicone rubber copies the master plate accurately and adheres to the clad base material, it fills only the recess between the mold and clad base material efficiently with the core forming resin, and a mold using silicone rubber can separate easily from the clad base material. From this mold, therefore, a macromolecular optical waveguide retaining the configurations thereof at high precision can be produced very easily.

2) A step of adhering a plastic film base material for clad capable of contacting tightly with the mold, tightly to the mold An optical device produced from the macromolecular optical waveguide of the invention is used in optical wiring in various layers, and the material of the plastic film base material for clad is properly selected in consideration of refractive index, light permeability, other optical characteristics, mechanical strength, heat resistance, adhesion with mold, flexibility and others, depending on the applications of the optical device.

Examples of the film include alicyclic acrylic resin film, alicyclic olefin resin film, triacetic cellulose film, and fluorine containing resin film. The refractive index of film base material is preferably 1.55 or less, or more preferably 1.53 or less, in order to keep enough difference in refractive index from the core.

The alicyclic acrylic resin film is, for example, OZ-1000, OZ-1100 (Hitachi Chemical Co., Ltd.) manufactured by introducing tricyclodecane or other alicyclic hydrocarbon in ester substituent.

The alicyclic olefin resin film is one having norbornene configuration in the main chain, in particular, one having norbornene configuration in the main chain and having polar group such as alkyl oxycarbonyl group (alkyl group having 1 to 6 carbon atoms or cycloalkyl group) in the side chain. Above all, the alicyclic olefin resin having norbornene configuration in the main chain and having polar group such as alkyloxycarbonyl group in the side chain as mentioned above is particularly suited to production of optical waveguide sheet of the invention because it is excellent in optical characteristics, having low refractive index (refractive index being about 1.50, assuring a sufficient difference in refractive index between core and clad) and high light permeability, excellent in adhesion to the mold, and excellent in heat resistance.

Thickness of the film is properly selected in consideration of flexibility, rigidity and ease of handling, and is generally about 0.1 mm to 0.5 mm.

3) A step of filling a through-hole at one end of the recess of the mold adhered to the plastic film base material for clad, with a curable resin for forming a core, and filling the recess of the mold with the curable resin for forming a core by evacuating and sucking from a through-hole at other end of the recess of the mold At this step, the through-hole provided at the supply side of resin is filled with curable resin for forming a core, and by evacuating and sucking through the through-hole at the discharge side of the resin, the gap (i.e., the recess of the mold) formed between the mold and the film base material for clad is filled. By evacuating and sucking, the adhesion of mold and film base material for clad is enhanced, and entry of foams can be avoided. For evacuating and sucking, a suction pipe is inserted into the through-hole at the discharge side, and the suction pipe is connected to a pump.

The curable resin for forming a core includes resins of radiation curing type, electron curing type and heat curing type, and above all the ultraviolet curable resin and thermosetting resin are preferably used. As the ultraviolet curable resin and thermosetting resin for forming a core, ultraviolet curing type and thermosetting type monomer, oligomer, or mixture of monomer and oligomer may be preferably used. As the ultraviolet curable resin, ultraviolet curable resins of epoxy system, polyimide system, and acrylic system may be preferably used.

The curable resin for forming a core is applied to fill in gaps (the recess of mold) formed between the mold and film base material by capillarity, and the curable resin for forming a core is required to be sufficiently low in viscosity for realizing such filling. Therefore, the viscosity of the curable resin is 10 mPa.s to 2000 mPa.s, preferably 20 mPa.s to 1000 mPa.s, or more preferably 30 mPa.s to 500 mPa.s.

Besides, in order to reproduce the original shape of the projecting portion corresponding to the optical waveguide core formed on the master plate at high precision, it is important that the volume change is small before and after curing of the curable resin. For example, decrease in volume leads to conduction loss. Therefore, the curable resin for forming a core is desired to be small in volume change as far as possible, for example, 10% or less, or preferably 6% or less. It is recommended to avoid lowering of viscosity by using a solvent because the volume change is large before and after curing.

To reduce the volume change (shrinkage) after curing of curable resin for forming a core, a polymer may be added to the resin. The polymer is preferred to be compatible with curable resin for forming a core, not having adverse effects on the resin refractive index, elasticity or permeability. By adding the polymer, not only the volume change can be decreased, but also it is effective to control the viscosity or glass transition point of cured resin at an advanced level. The polymer includes acrylic system, methacrylic system, epoxy system, and many others.

The refractive index of the cured matter of curable resin for forming a core is required to be larger than that of the film base material as the clad (including the clad layer in step 5) below), and is 1.50 or more, preferably 1.53 or more. The difference in refractive index between the clad (including the clad layer in step 5) below) and the core is 0.01 or more, preferably 0.03 or more.

4) A step of curing the applied curable resin for forming a core, and separating the mold from the plastic film base material for clad At this step, the applied curable resin for forming a core is cured. To cure the ultraviolet curable resin, ultraviolet lamp, ultraviolet LED, or UV irradiation equipment is used, and to cure the thermosetting resin, it is heated in an oven.

The mold used at steps 1) to 3) may be directly used in the clad layer as far as the conditions such as refractive index are satisfied, and in such a case, separation of the mold is not required and it can be directly used as clad layer. In this case, it is preferred to treat the mold in ozone in order to enhance the adhesion between the mold and core material.

5) A step of forming a clad layer on the plastic film base material for clad on which the core is formed A clad layer is formed on the film base material forming a core, and the clad layer to be used may be a film base material for clad used in the film process (step 2), a layer formed by applying and curing a curable resin for clad, and a macromolecular film obtained by applying and drying a solvent solution of macromolecular membrane. As the curable resin for clad, ultraviolet curable resin or thermosetting resin is used preferably, and for example, monomer, oligomer or mixture of monomer and oligomer of ultraviolet curing type or thermosetting type may be used.

To reduce a volume change (shrinkage) after curing of curable resin for clad, the resin may be blended with a polymer (for example, methacrylic system, epoxy system), which is compatible with the resin and does not have adverse effects on resin refractive index, elasticity or permeability.

When using a film as clad layer, it may be adhered by using an adhesive, and at this time the refractive index of the adhesive is desired to be closer to the refractive index of the film. As the adhesive, the ultraviolet curing type resin or thermosetting resin is used preferably. For example, monomer, oligomer or mixture of monomer and oligomer of ultraviolet curing type or thermosetting type may be used. To reduce the volume change (shrinkage) after curing of ultraviolet curable resin or thermosetting resin, a polymer of the same type as the polymer added to the clad layer may be added.

The refractive index of the clad layer is desired to be 1.55 or less, preferably 1.53 or less in order to assure a sufficient difference in refractive index from the core. From the viewpoint of entrapping the light, the refractive index of the clad layer is preferred to be similar to the refractive index of the film base material.

A method of manufacturing this macromolecular optical waveguide film is based on the following finding: by adhering a plastic film base material for clad, which exhibits favorable adhesion to the mold, tightly to the mold, the curable resin for curing a core can be provided only in the recess, without necessity of fixing the two by using special means, and with no gap allowed between the mold and clad base material, except for the recess configuration formed in the die.

Accordingly, the manufacturing process is extremely simplified, and a macromolecular optical waveguide film can be produced easily. Therefore, as compared with the conventional method of manufacturing a macromolecular optical waveguide film, a macromolecular optical waveguide film can be manufactured at an extremely low cost.

In this manufacturing method, through-holes are provided in the mold, and the discharge side of curable resin for forming a core of the recess of the mold is evacuated and sucked through the through-holes, and the adhesion of the mold and film base material is further enhanced, and entry of foams can be avoided. Further, in spite of a simple method, the obtained macromolecular optical waveguide film is small in conduction loss and high in precision, and free mounting on various devices is possible.

[Optical Transmission and Reception Section]

Referring to FIGS. 5A to 5C and FIGS. 6A to 6C, a configuration of optical transmission and reception section 12 having a sub-mount 22 is explained. A sub-mount 24 is same as sub-mount 22 in configuration. As an optical transmission and reception section 14 is the same as the optical transmission and reception section 12 in configuration, the detailed description of a sub-mount 24 and an optical transmission and reception section 14 will be omitted.

Figure 5A:
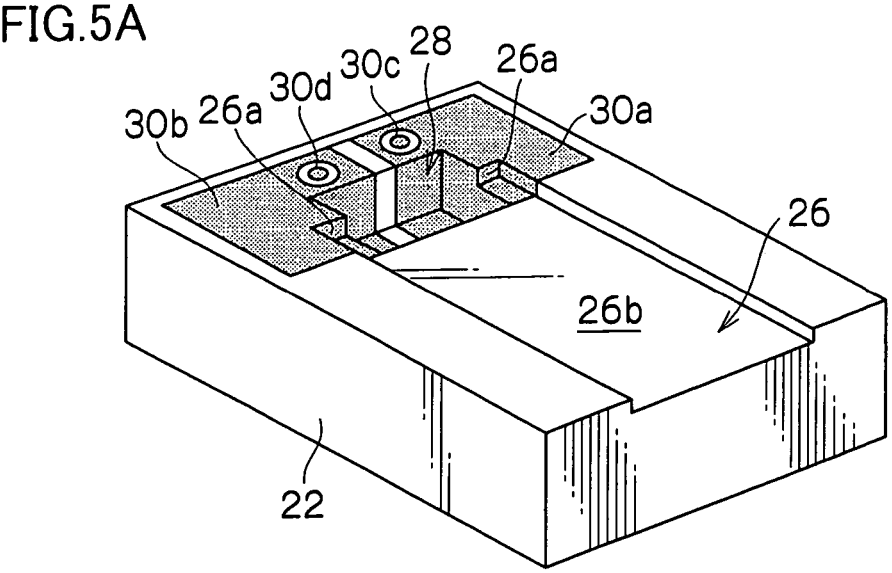
FIG. 5A is a perspective view of sub-mount in first embodiment.
Figure 5B:
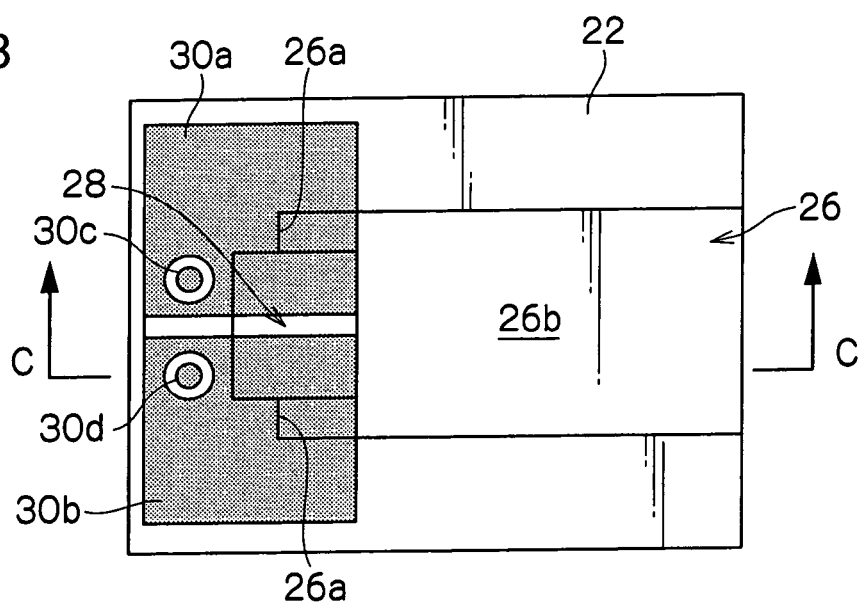
FIG. 5B is a plan view of sub-mount of FIG. 5A.
Figure 5C:
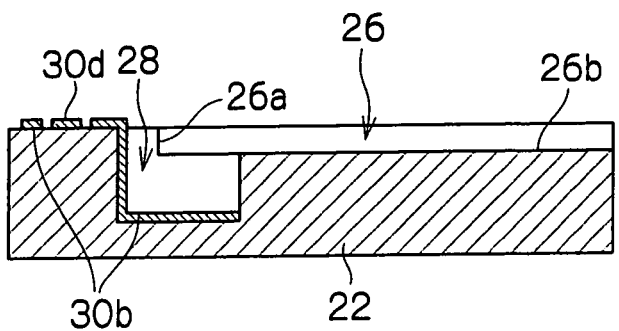
FIG. 5C is a sectional view taken along C-C of FIG. 5B.

First, referring to FIGS. 5A to 5C, the configuration of sub-mount 22 is explained. FIG. 5A is a perspective view of sub-mount 22, FIG. 5B is a plan view of sub-mount 22, and FIG. 5C is a sectional view C-C of FIG. 5B.

The sub-mount 22 is made of a rectangular parallelepiped substrate. This sub-mount 22 has a notch 26 for mounting a macromolecular optical waveguide film 10, and a recess 28 for fitting and holding a light detecting element and a light emitting element. In this example, one recess 28 is formed, but two recesses may be formed corresponding to each one of the light detecting element and light emitting element. The notch 26 includes an abutting surface 26a abutting against a abutting surface 10a of the macromolecular optical waveguide film 10, and a mounting surface 26b for mounting the end of the macromolecular optical waveguide film 10.

In part of the surface of the sub-mount 22, electrode films 30a, 30b, 30c, 30d are formed for electrical wiring with the light detecting element and light emitting element. In this example, the electrode films 30a, 30b are patterned so as to be extended to the topsurface of the sub-mount 22 from the bottom surface of the recess 28 by way of the side surface.

The electrode films 30c, 30d are patterned on the topsurface of the sub-mount 22 so as to be insulated from the electrode films 30a, 30b. By forming the electrode films at the side of the sub-mount 22, electrical wiring is easily provided in the light detecting element and light emitting element when installing the light transmission and reception module in a package.

The sub-mount 22 is provided by forming a notch 26 or a recess 28 in a crystal substrate of silicon (Si) or the like, a glass substrate of quartz glass or the like, or a metal substrate of nickel (Ni), copper (Cu), cobalt (Co) or the like.

The method of forming the notch 26 and recess 28 is preferably a reactive ion etching (RIE) method of high shape precision. The electrode films 30a, 30b, 30c, 30d are, for example, formed by vapor-depositing a metal film of gold (Au), aluminum (Al) or the like on the surface of sub-mount 22, and patterning this metal film by the technology of photolithography.

Figure 6A:
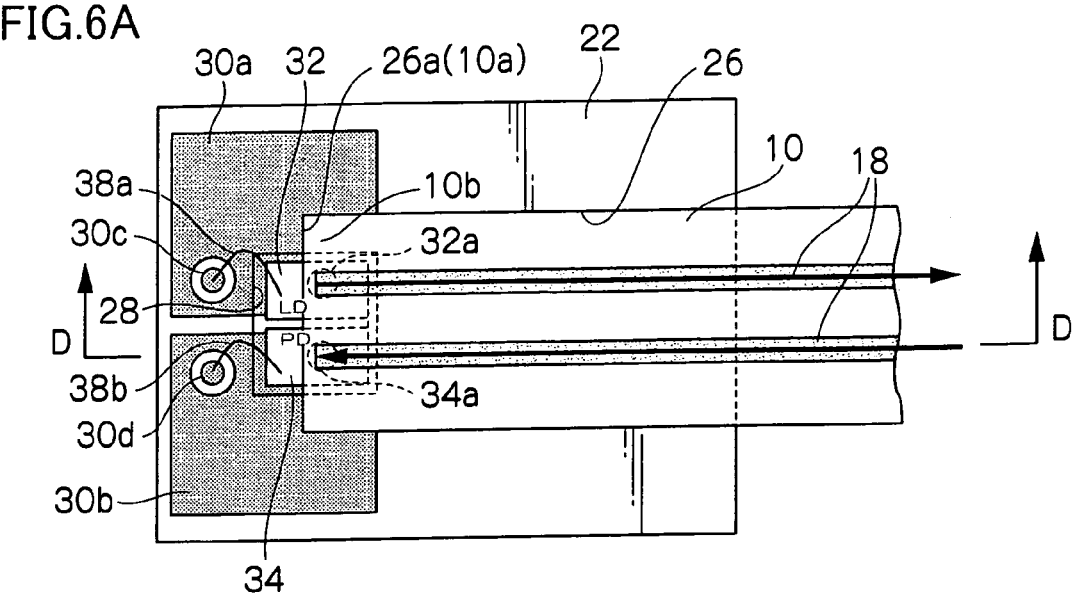
FIG. 6A is a plan view of optical transmission and reception section in first embodiment.
Figure 6B:
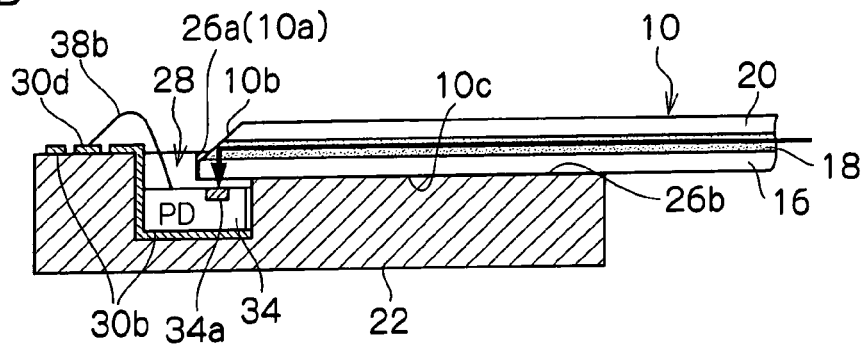
FIG. 6B is a sectional view taken along D-D of FIG. 6A.
Figure 6C:
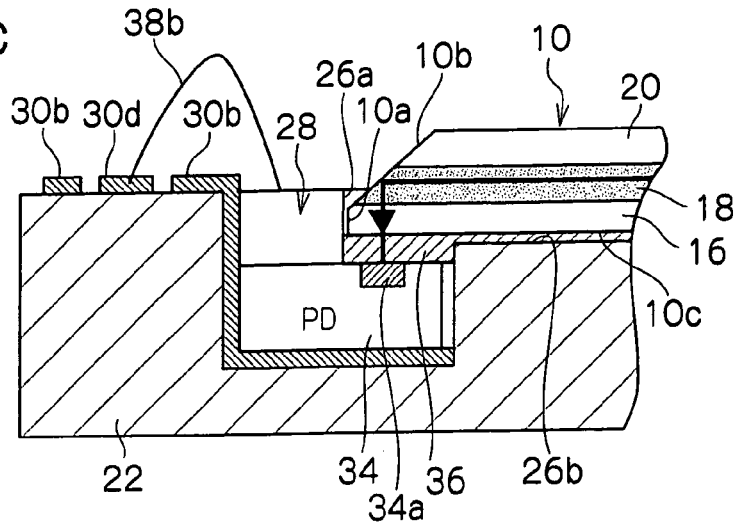
FIG. 6C is a partially enlarged view of photo coupler in FIG. 6B.

Referring next to FIG. 6, a mounting state of optical transmission and reception section 12 is explained. FIG. 6A is a plan view of optical transmission and reception section 12, FIG. 6B is a sectional view taken along D-D (sectional view along the optical axis of optical waveguide) of FIG. 6A, and FIG. 6C is a partially magnified view showing an optical coupler in FIG. 6B.

When mounting the light transmission and reception module, surface emission type semiconductor laser diode (LD) 32 as light emitting element, photo diode (PD) 34 as light detecting element, and macromolecular optical waveguide film 10 are held on the sub-mount 22 of the optical transmission and reception section 12.

The end of macromolecular optical waveguide film 10 is fitted into the notch 26 of the sub-mount 22. That is, the abutting surface 10a abuts against the abutting surface 26a of the sub-mount 22, and is positioned at specified position, and the film side 10c of the light incident and the exit side is mounted on the sub-mount 22 so as to be opposite to the mounting surface 26b of the sub-mount 22. By thus holding the macromolecular optical waveguide film 10 on the mounting surface 26b, the flexible macromolecular optical waveguide film 10 can be held stably.

The film side 10c is adhered to the opposing mounting surfaces 26b, LD 32 and PD 34 by means of adhesive 36. The adhesive 36 may be photosetting adhesive such as ultraviolet curable resin, or thermosetting resin, but in order to reduce the optical loss, it is preferable to use the same curable resin as used in the clad 16 of the macromolecular optical waveguide film 10.

The LD 32 and PH 34 are fitted in the recess 28 of the sub-mount 22, and are fixed in the bottom surface of the recess 28. By fitting the LD 32 and PH 34 in the recess 28, the optical transmission and reception section 12 is made compact. In this example, electrode films 30a, 30b are formed in the bottom surface of the recess 28. Therefore, the back electrode of LD 32 and electrode film 30a, and the back electrode of PD 34 and electrode film 30b are fixed in the bottom surface of the recess 28 by conductive solder or the like so as to conduct with each other electrically.

Other electrode of LD 32 is electrically connected to the electrode film 30c by wire 38a, and other electrode of PD 34 is electrically connected to the electrode film 30d by wire 38b.

The LD 32 and PD 34 are disposed at specified positions, depending on the abutting position of the abutting surface 10a, so that the emitter 32a of the LD 32 is opposite to the end surface (incident end surface) of the core 18 of the optical waveguide for transmission of macromolecular optical waveguide film 10, and that the detector 34a of the PD 34 is opposite to the end surface (exit end surface) of the core 18 of optical waveguide for reception of macromolecular optical waveguide film.

Herein, the optical waveguide for transmitting an optical signal from the optical transmission and reception section 12 is the optical waveguide for transmission, and the optical waveguide for receiving an optical signal from the optical transmission and reception section 12 is the optical waveguide for reception. As seen from the optical transmission and reception section 14, needles to say, the optical waveguide for transmission and optical waveguide for reception are inverted.

The optical transmission and reception section 12 can be assembled easily, by fitting the LD 32 and PD 34 in the recess 28 of the sub-mount 22, and fitting the macromolecular optical waveguide film 10 in the notch 26 of the sub-mount 22.

In this embodiment, the macromolecular optical waveguide film 10 is composed of a transparent resin, and the position of end of core 18 of the optical waveguide can be observed by making use of back surface reflection of the mirror 10*b*. Therefore, by using the back surface reflection image on the mirror 10*b*, alignment of LD 32 and PD 34 is easy, and mounting of high precision is possible by passive alignment.

[Operation of Light Transmission and Reception Module]

Referring to FIG. 7, the operation of the light transmission and reception module of the embodiment is explained. FIG. 7 is a view schematically showing a structure of light transmission and reception module. Herein, it is supposed that the optical waveguide for transmitting an optical signal from the optical transmission and reception section 12 is the optical waveguide for transmission, and the optical waveguide for receiving an optical signal from the optical transmission and reception section 12 is the optical waveguide for reception.

In the light transmission and reception module of the embodiment, when transmitting an optical signal from the optical transmission and reception section 12 to the optical transmission and reception section 14, the light emitted from the LD 32 held on the sub-mount 22 of the optical transmission and reception section 12 is coupled to the incident end surface of the core 18 of optical waveguide for transmission, and is guided in the optical waveguide for transmission formed in the macromolecular optical waveguide film 10. The light emitted from the exit end surface of the core 18 of optical waveguide for transmission is received in the PD 34 held in the sub-mount 24 of the optical transmission and reception section 14.

Similarly, when receiving an optical signal transmitted from the optical transmission and reception section 14 by the optical transmission and reception section 12, the light emitted from the LD 32 held in the sub-mount 24 of the optical transmission and reception section 14 is coupled to the incident end surface of the core 18 of optical waveguide for reception, and is guided in the optical waveguide for reception formed in the macromolecular optical waveguide film 10. The light emitted from the exit end surface of the core 18 of optical waveguide for reception is received in the PD 34 held in the sub-mount 22 of the optical transmission and reception section 12.

As explained above, in the light transmission and reception module of the embodiment, light communication is exchanged in two directions between a set of optical transmission and reception sections as mentioned above. The flexible belt-shaped macromolecular optical waveguide film has a property of following up the deformation such as bending, folding or twisting, and therefore if the film is deformed, optical signal can be transmitted and received by way of optical waveguide formed in the macromolecular optical waveguide film. Therefore, it can be used in optical wiring of often-bent-or-folded connection of cellphone, slim personal computer or mobile appliance.

In the light transmission and reception module of the embodiment, since the electrode films are formed at the sub-mount side, when installing the light transmission and reception module in a package, electrical wiring can be easily provided in light detecting element and light emitting element of the optical transmission and reception section.

In the light transmission and reception module of the embodiment, moreover, since the sub-mount processed in a specified shape is used, as shown in (1) to (4) below, it is easier to mount the macromolecular optical waveguide film, light emitting element and light detecting element.

(1) The sub-mount has a notch with a mounting surface for mounting the end of the macromolecular optical waveguide film, and the macromolecular optical waveguide film is held on the surface by this mounting surface, so that the flexible macromolecular optical waveguide film can be stably held on the sub-mount.

(2) A abutting surface for positioning is formed on the end surface of macromolecular optical waveguide film, and the sub-mount has a notch with an abutting surface for abutting against the poking surface. Hence, the macromolecular optical waveguide film can be mounted easily by using this abutting surface. In this case, by forming the notch at high precision by RIE or the like, the mounting precision of macromolecular optical waveguide film can be enhanced.

(3) Since the sub-mount has a recess for holding the light emitting element and light detecting element, only by fitting the light emitting element and light detecting element in this recess, the light emitting element and light detecting element can be mounted easily. In this case, by forming the recess precisely by RIE or the like, the mounting precision of light emitting element and light detecting element can be enhanced. Besides, by fitting the light emitting element and light detecting element into the recess formed in the sub-mount, the optical transmission and reception section is made compact.

(4) Usually, by providing a cut angle of 45 degrees in the macromolecular waveguide, the light is totally reflected and it is hard to recognize the position of the core of the waveguide by observing the reflected light or transmitted light. Hence, when a cut angle of 45 degrees is imparted to the core of the waveguide, it is difficult to align the waveguide with the light emitting and detecting elements, whereby active alignment is necessitated. In this embodiment, by contrast, since a transparent macromolecular optical waveguide film is used, the position of 45-degree face of the waveguide core can be observed by back surface reflection image, and by using such back surface reflection image, the light emitting element and light detecting element can be mounted at high precision by passive alignment.

[Other Electrode Layout]

In this embodiment, electrode films are formed so as to be extend from the bottom surface to the side surface of the recess formed in the sub-mount, up to the top surface of the sub-mount, and the back surface electrodes of LD and PD and electrode films are connected to conduct electrically. However, the forming pattern of electrode films is not limited to this layout alone.

Figure 8A:
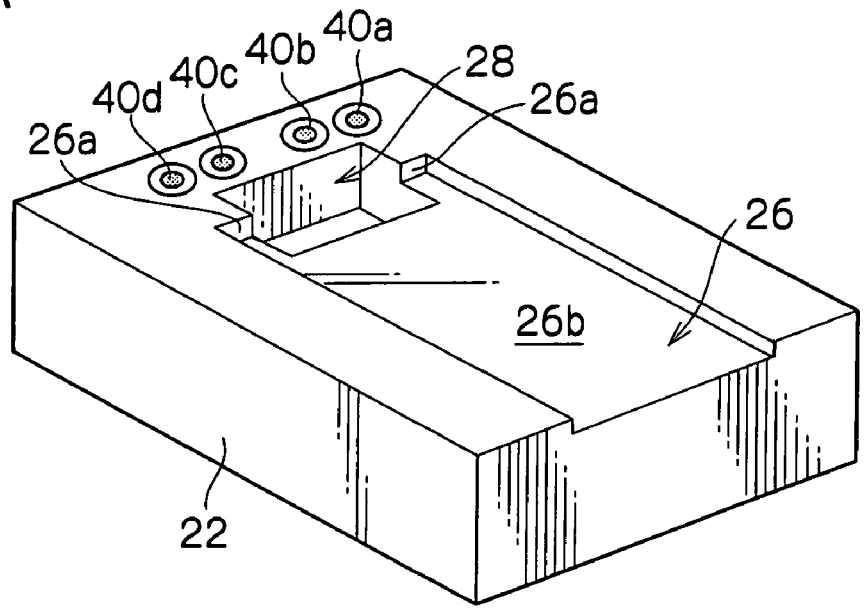
FIG. 8A is a diagram of layout pattern of electrode film in the first embodiment.
Figure 8B:
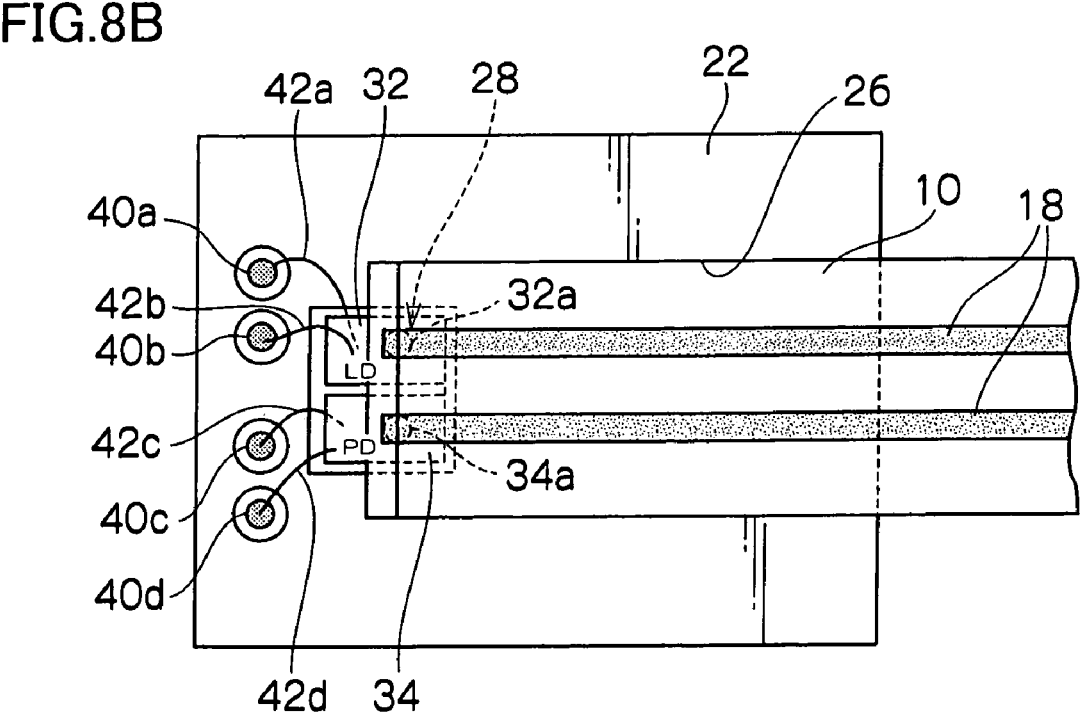
FIG. 8B is a diagram of other layout pattern of electrode film in the first embodiment.

For example, as shown in FIG. 8A, mutually insulated electrode films 40*a*, 40*b*, 40*c*, 40*d* are formed on the top surface of the sub-mount 22. When mounting the light transmission and reception module, as shown in FIG. 8B, these electrode films 40*a*, 40*b* and electrodes of LD 32 are electrically connected by means of wires 42*a*, 42*b*, and electrode films 40*c*, 40*d* and electrodes of PD 34 are electrically connected by means of wires 42*c*, 42*d*.

[Other Module Configuration]

In this embodiment, the light transmission and reception module is intended to exchange optical communications in two directions between the optical transmission and reception sections mounting both the light emitting element and the light detecting element. However, the light transmission and reception module may be also designed to make optical communications in one direction between the optical transmitter having the light emitting element and the optical receiver having the light detecting element.

EXAMPLES

The invention is more specifically described below by referring to examples, but the present invention is not limited to these examples alone.

Example 1

<Production of Macromolecular Optical Waveguide Film>

A thick film resist (SU-8 of Microchemical) is applied on a Si substrate by spin coating, prebaked at 80 deg. C., exposed through photo mask, and developed, whereby four projecting portions of square section (width: 50 µm, height: 50 µm, length: 80 mm) are formed. Interval of projecting portions is set to be 250 µm. By post baking at 120 deg. C., a master plate for forming macromolecular optical waveguide is produced.

A releasing agent is applied on the master plate, and a mixture of thermosetting liquid dimethyl siloxane rubber (SYLGARD184 of Dow-Corning Asia, viscosity 5000 mPa.s) and its hardening agent is poured onto the master plate, and heated and cured for 30 minutes at 120 deg. C. After releasing, a die (die thickness: 5 mm) having a recess corresponding to the projecting portion of a rectangular section is produced.

Further, a through-hole of circular top view, having a section tapered in mold thickness direction, is formed by punching to communicate with the recess at one end and other end of the recess, whereby a mold is produced.

This mold is adhered tightly to a film base material for clad (Arton Film of JSR Co., refractive index 1.510) of film thickness of 100 µm, which is one size larger than the mold. A few drops of ultraviolet curable resin of viscosity of 500 mPa.s are dropped into supply side through-hole of the mold, and the discharge side (i.e., the evacuating and sucking side) through-hole is evacuated and sucked, such that the recess is filled with ultraviolet curable resin in 10 minutes. It is cured by emitting ultraviolet light of 50 mW/cm² irradiated from above the mold for 5 minutes, and the mold is separated from Arton Film, whereby a core of same shape as projecting portion of master plate is formed on the Arton Film.

On the core forming side of Arton film, ultraviolet curable resin of which refractive index after curing is 1.510, which is the same as that of Arton Film, is applied by coating. A film base material for clad of 100 µm is attached thereto, and ultraviolet light of 50 mW/cm² is irradiated thereon for 5 minutes to cure, such that two films are adhered and a belt-shaped macromolecular optical waveguide film of 1.5 mm in width and 300 µm in thickness is obtained. The bending radius tolerance of macromolecular optical waveguide film is 2 mm.

Using a dicing saw with Si blade of 45-degree angle, both ends of this macromolecular optical waveguide film are cut off at an angle of 45 degrees with respect to the optical axis, and a core having a 45-degree mirror surface is exposed. The clad portion is cut off vertically to the optical axis at a position of 50 µm from the leading end, and a macromolecular optical waveguide film having 45-degree mirror surface and vertical cut section at both ends is obtained.

<Production of Sub-Mount>

On Si substrate of 600 µm in thickness, two recesses for mounting light emitting element and light detecting element are formed by RIE. The depth of recess is 250 µm. Further, to mount macromolecular optical waveguide film, a notch of 50 µm in depth having an abutting surface for abutting against the vertical cut section of macromolecular optical waveguide film is formed by RIE.

After vapor-depositing Au in a thickness of 200 nm on the top surface of sub-mount, Au electrode is patterned by photolithography, and an electrode pad for lower electrode extending to the top surface of sub-mount from the bottom surface of each recess by way of the side surface thereof, and an electrode pad for upper electrode insulated from this electrode pad are formed. By cutting off the Si substrate having these electrode pads, Si sub-mount is formed.

<Mounting of Module>

In the recess for light emitting element of Si sub-mount, VCSEL element (Fuji Xerox) is mounted across Sn—Au solder, and in the recess for light detecting element, a photo diode element is mounted with Sn—Au solder interposed therebetween. By heating to 250 deg. C., VCSEL element and photo diode element are fixed in the specified recesses of the Si sub-mount. As a result, the lower electrodes of VCSEL element and photo diode element are electrically connected with the electrode pads. Further, the upper electrode of VCSEL element and the corresponding electrode pad, and the upper electrode of photo diode element and the corresponding electrode pad are bonded by using Au wire.

Both ends of macromolecular optical waveguide film each having a 45-degree mirror surface are fitted into different notches of a Si sub-mount, and positioning is effected by abutting the vertical cut section against the abutting surface of the sub-mount. The preliminarily applied ultraviolet curable resin is cured by ultraviolet irradiation, and the macromolecular optical waveguide film is fixed on the sub-mount. As a result, a two-way light transmission and reception module of example 1 having a pair of optical transmission and reception sections and macromolecular optical waveguide film is obtained.

<Evaluation of Communication Performance>

By driving VCSEL element by 3 mA current and emitting light at 1 mW, performance of light transmission and reception is evaluated by using sampling oscilloscope (Agilent 86100C of Agilent Technologies) and pulse pattern generator. The two-way light transmission and reception module of example 1 is proved to exhibit excellent eye patterns up to 3.125 Gbps, although the belt-shaped macromolecular optical waveguide film is bent, folded and twisted as shown in FIG. 2A and FIG. 2B.

Example 2

<Production of Macromolecular Optical Waveguide Film>

A macromolecular optical waveguide film is produced in the same procedure as in example 1. A macromolecular optical waveguide film of 1.5 mm in width, 300 µm in thickness, and 2 mm in allowable bending radius is obtained.

<Production of Sub-Mount>

Si sub-mount is produced in the same procedure as in example 1, except that Au electrodes are patterned by photolithography so as to from electrode pad for lower electrode and electrode pad for upper electrode on the top surface of sub-mount.

<Mounting of Module>

In the recess for light emitting element of the obtained Si sub-mount, VCSEL element and photo diode element, which are the same as in example 1, are fixed by using epoxy adhesive (Hitachi Chemical Co., Ltd.). The upper electrode and lower electrode of VCSEL element and corresponding electrode pads are bonded by using Au wire, and the upper electrode and lower electrode of photo diode element and corresponding electrode pads are bonded by using Au wire.

Both ends of macromolecular optical waveguide film forming 45-degree mirror surface are fitted into different notches of Si sub-mount, and positioning is effected by abutting the vertical cut section against the abutting surface of the sub-mount. The ultraviolet curable resin applied in advance is cured by ultraviolet irradiation, and the macromolecular optical waveguide film is fixed on the sub-mount. As a result, a two-way light transmission and reception module of example 2 having a pair of optical transmission and reception sections and macromolecular optical waveguide film is obtained.

<Evaluation of Communication Performance>

By driving VCSEL element by 3 mA current and emitting light at 1 mW, performance of light transmission and reception is evaluated by using sampling oscilloscope (Agilent 86100C of Agilent Technologies) and pulse pattern generator. The two-way light transmission and reception module of example 2 is proved to exhibit excellent eye patterns up to 3.125 Gbps, although the belt-shaped macromolecular optical waveguide film is bent, folded and twisted as shown in FIG. 2A and FIG. 2B.

Example 3

A two-way light transmission and reception module of example 3 is produced in the same procedure as in example 1, except that the module is made by using a quartz glass sub-mount formed by using quartz glass substrate of 600 μm in thickness instead of Si substrate of 600 μm in thickness.

<Evaluation of Communication Performance>

By driving VCSEL element by 3 mA current and emitting light at 1 mW, performance of light transmission and reception is evaluated by using sampling oscilloscope (Agilent 86100C of Agilent Technologies) and pulse pattern generator. The two-way light transmission and reception module of example 3 is proved to exhibit excellent eye patterns up to 3.125 Gbps, although the belt-shaped macromolecular optical waveguide film is bent, folded and twisted as shown in FIG. 2A and FIG. 2B.

Example 4

A two-way light transmission and reception module of example 4 is produced in the same procedure as in example 2, except that the module is made by using a quartz glass sub-mount formed by using quartz glass substrate of 600 μm in thickness instead of Si substrate of 600 μm in thickness.

<Evaluation of Communication Performance>

By driving VCSEL element by 3 mA current and emitting light at 1 mW, performance of light transmission and reception is evaluated by using sampling oscilloscope (Agilent 86100C of Agilent Technologies) and pulse pattern generator. The two-way light transmission and reception module of example 4 is proved to exhibit excellent eye patterns up to 3.125 Gbps, although the belt-shaped macromolecular optical waveguide film is bent, folded and twisted as shown in FIG. 2A and FIG. 2B.

As shown in these examples 1 to 4, in the light transmission and reception module of the invention, since the belt-shaped macromolecular optical waveguide film has a high flexibility, if the film is deformed by bending, folding or twisting, the optical signal can be transmitted and received through the optical waveguide formed in the macromolecular optical waveguide film.

Additionally, only by fitting the macromolecular optical waveguide film and light emitting and detecting elements into the notches and recesses formed at specified positions of the sub-mount, the constituent components can be aligned, and mounted very easily and reliably.

Second Embodiment

Referring now to the drawings, a second embodiment of the invention is specifically described below.

[Light Transmission and Reception Module]

Figure 9:
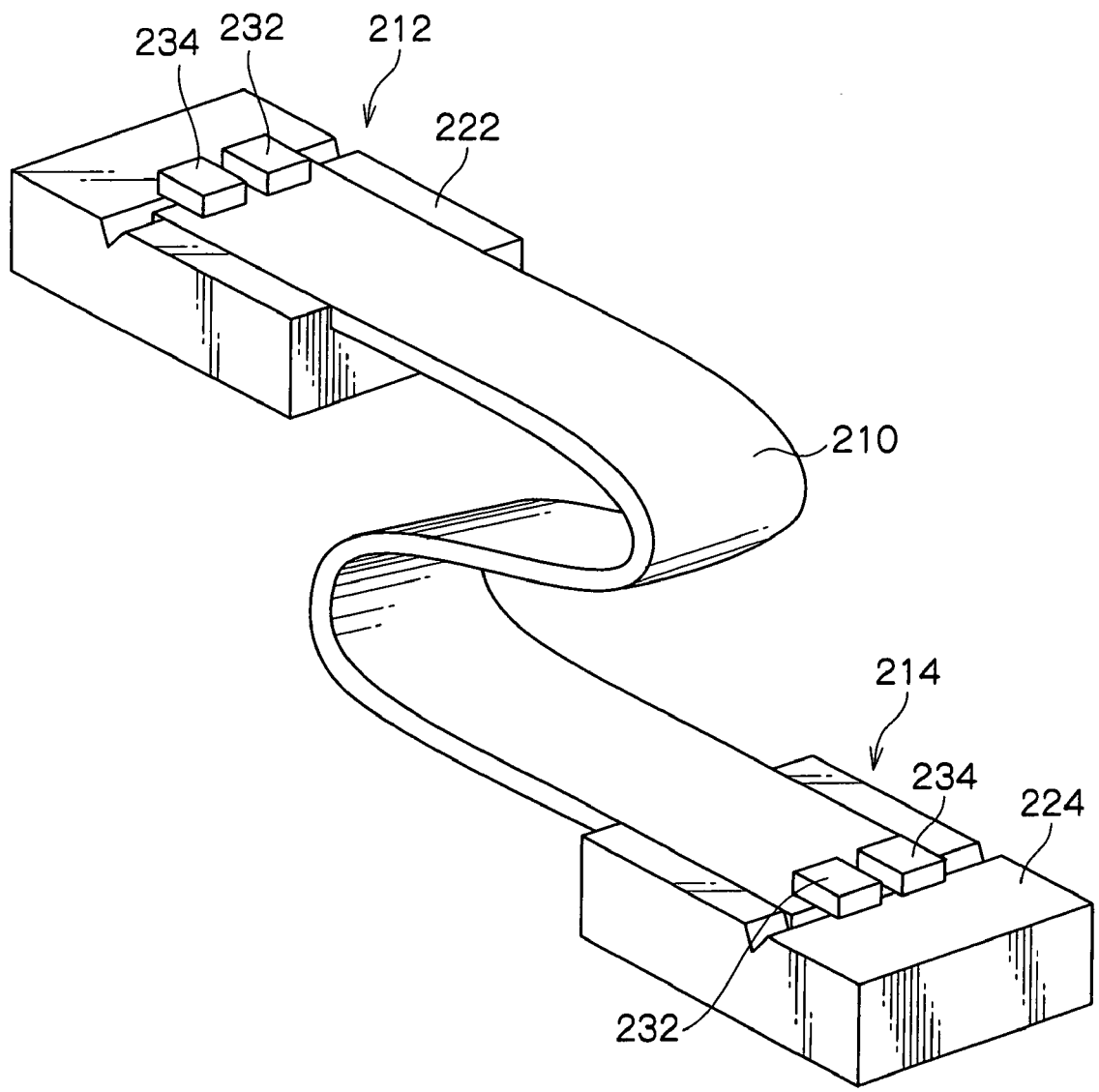
FIG. 9 is a schematic structural diagram of light transmission and reception module in the second embodiment.

FIG. 9 is a schematic structural diagram of light transmission and reception module in the second embodiment. This light transmission and reception module is composed of, as shown in FIG. 9, a belt-shaped macromolecular optical waveguide film 210, and optical transmission and reception sections 212, 214 for transmitting and receiving an optical signal through an optical waveguide formed in the macromolecular optical waveguide film 210. The optical transmitter 212 has a surface emission type semiconductor laser diode (LD) 232 as light emitting element, a photo diode (PD) 234 as light detecting element, and a sub-mount 222, and one end of the macromolecular optical waveguide film 210 is held on the sub-mount 222. The optical transmission and reception section 214 has LD 232, PD 234, and sub-mount 224, and other end of the macromolecular optical waveguide film 210 is held on the sub-mount 224.

Other features of the macromolecular optical waveguide film 210 are same as in the macromolecular optical waveguide film 10 of the first embodiment, and explanation will be omitted.

[Macromolecular Optical Waveguide Film]

Figure 10A:
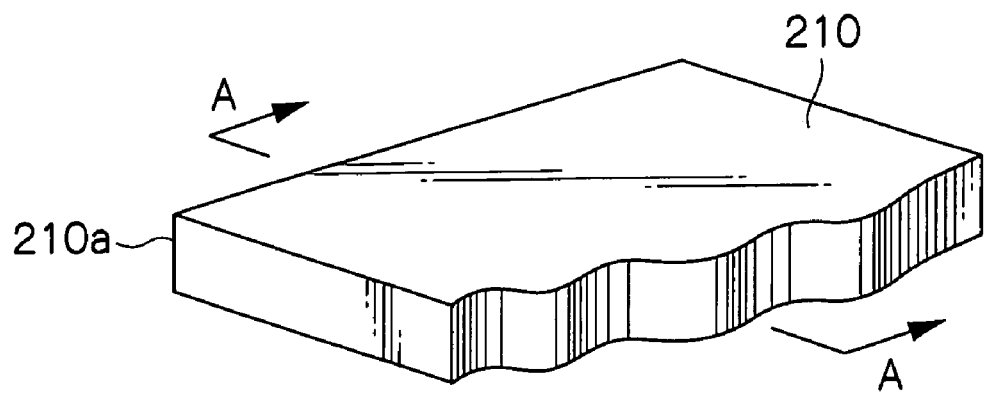
FIG. 10A is a perspective view of end portion of macromolecular optical waveguide film in the second embodiment.
Figure 10B:
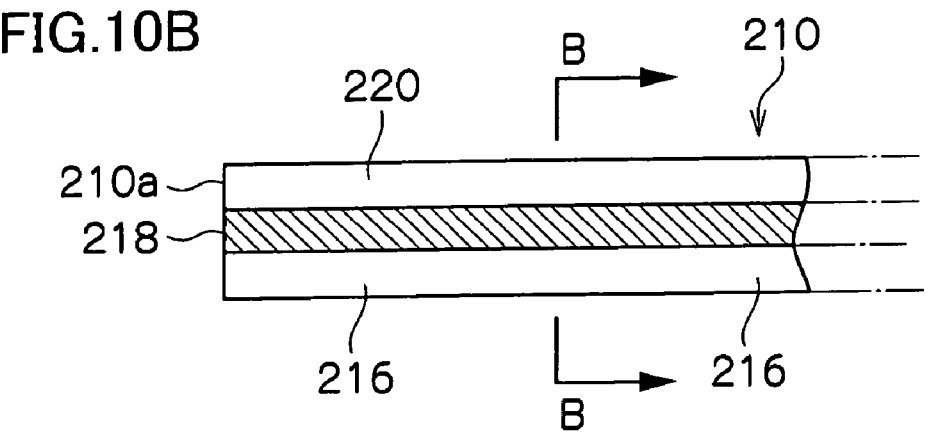
FIG. 10B is a sectional view taken along A-A of FIG. 10A.
Figure 10C:
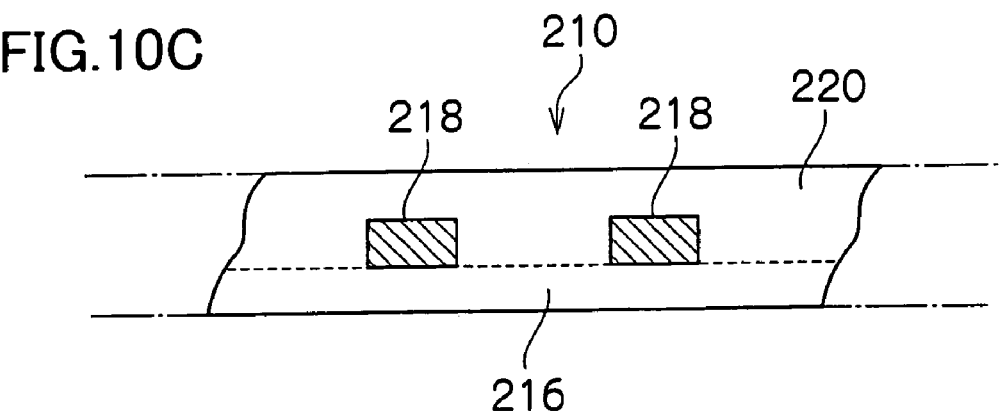
FIG. 10C is a sectional view taken along B-B of FIG. 10A.

Referring to FIGS. 10A to 10C, the configuration of macromolecular optical waveguide film 210 is explained. FIG. 10A is a perspective view of end portion of macromolecular optical waveguide film 210, FIG. 10B is a sectional view taken along A-A (along optical axis of optical waveguide) of FIG. 10A, and FIG. 10C is a sectional view taken along B-B of FIG. 10B.

As shown in the drawing, the macromolecular optical waveguide film 210 is composed of a square-shaped core 218 extending in film length direction, and clads 216, 220 surrounding this core 218. In the macromolecular optical waveguide film 210, plural cores 218 are disposed parallel in the film width direction, and plural optical waveguides are formed in the film. In this example, two optical waveguides are formed in the film 210. At the end of the macromolecular optical waveguide film 210, an end surface 210a vertical to the optical axis of optical waveguide is formed.

This macromolecular optical waveguide film 210 can be manufactured, for example, in the following steps (1) to (6):
(1) a step of preparing a mold formed from a cured layer of curable resin for forming a mold, having a recess corresponding to optical waveguide core projecting portion, and two or more through-holes penetrating through one end and other end of the recess, (2) a step of adhering a plastic film base material for clad capable of contacting tightly with the mold, tightly to the mold, (3) a step of filling a through-hole at one end of the recess of the mold adhered to the plastic film base material for clad, with a curable resin for forming a core, and filling the recess of the mold with the curable resin for forming a core by evacuating and sucking from a through-hole at other end of the recess of the mold, (4) a step of curing the applied curable resin for forming a core, and separating the mold from the plastic film base material for clad, (5) a step of forming a clad layer on the plastic film base material for clad on which the core is formed, and (6) a step of forming an end surface of macromolecular optical waveguide film by dicing.

As the manufacturing process of macromolecular optical waveguide film of the embodiment (preparation of master plate, preparation of mold) is the same as the process explained in FIGS. 4A to 4G of the manufacturing process of macromolecular optical waveguide film explained in the first embodiment, the detailed explanation thereof will be omitted.

[Optical Transmission and Reception Section]

Referring to FIG. 11 and FIGS. 12A to 12C, a configuration of optical transmission and reception section 212 having a sub-mount 222 will be explained. As a sub-mount 224 is the same as sub-mount 222 in configuration, and optical transmission and reception section 214 is the same as optical transmission and reception section 212 in configuration, explanation of the sub-mount 224 and the optical transmission and reception section 214 will be omitted.

Figure 11:
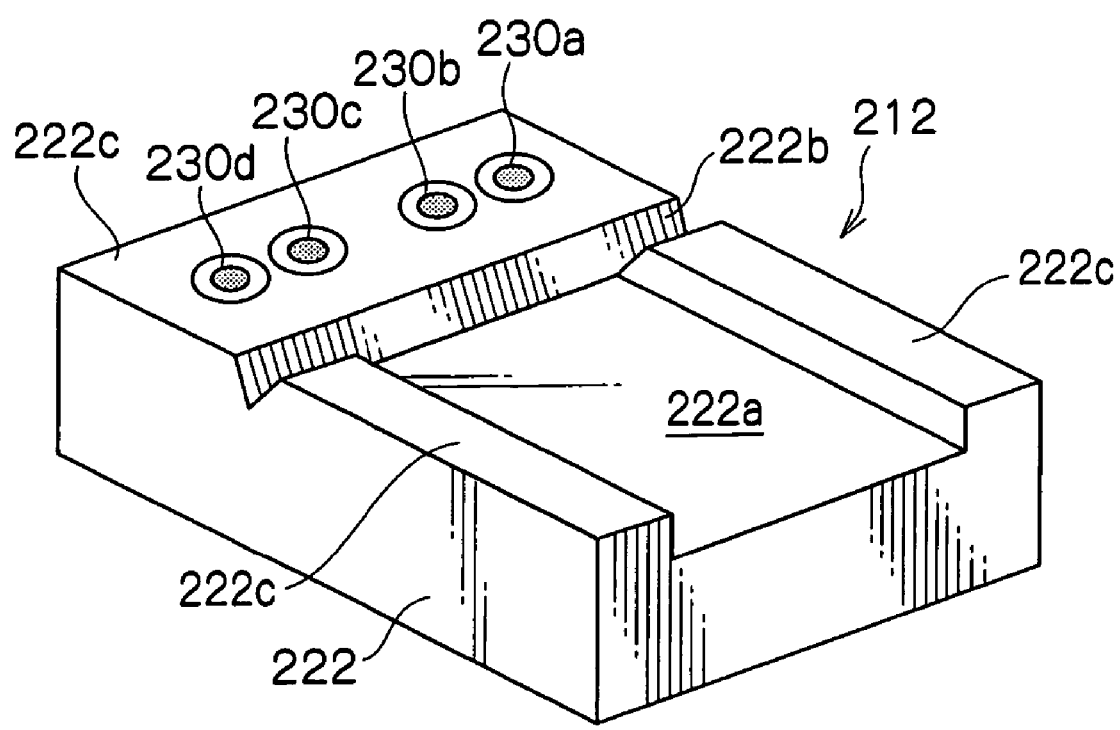
FIG. 11 is a perspective view of sub-mount in the second embodiment.

First, referring to FIG. 11, the configuration of sub-mount 222 is explained. FIG. 11 is a perspective view of sub-mount 222.

The sub-mount 222 is made of a substantially rectangular parallelepiped substrate. This sub-mount 222 has a mounting surface 222a for mounting an end of a macromolecular optical waveguide film 210, a mirror surface 222b continuous with the mounting surface 222a and forming an angle of 45 degrees with respect to the mounting surface 222a, and an electrode forming surface 222c for forming an electrode film therein.

The mounting surface 222a is formed lower than the electrode forming surface 222c by the portion of thickness of the macromolecular optical waveguide film 210, by cutting off a portion of the substrate of the sub-mount 222 from the surface. The sub-mount 224 has a mounting surface 224a, a mirror surface 224b, and an electrode forming surface 224c.

The mirror surface 222b functions as optical path converting plane for converting the optical path of incident light. For example, when light enters the mirror surface 222b at an angle of 45 degrees, its optical path is bent by 90 degrees by the mirror surface 222b. The mirror surface 222b is formed by cutting the substrate of the sub-mount 222 by 45 degrees to form a cut section, and forming a metal film of high reflectivity on the formed cut section. Or when the sub-mount 222 is formed by using Si crystal substrate or metal substrate, the cut section may be directly used as the mirror surface.

On the electrode forming surface 222c of the sub-mount 222, electrode films 230a, 230b, 230c, 230d are formed for electrical wiring with the light detecting element and light emitting element. In this example, the electrode films 230a, 230b, 230c, 230d are patterned on the electrode forming surface 222c so as to be insulated from each other. By forming the electrode films at the side of the sub-mount 222, electrical wiring is easy to the light detecting element and light emitting element when installing the light transmission and reception module in a package.

The sub-mount 222 is produced by forming the mounting surface 222a and mirror surface 222b as explained above on a crystal substrate of silicon (Si) or the like, a glass substrate of quartz glass or the like, or a metal substrate of nickel (Ni), copper (Cu), cobalt (Co), aluminum (Al), titanium (Ti) or the like. For example, after forming steps from the mounting surface 222a and mirror surface 222b by etching, the section is cut in a specified thickness by using an angled blade, whereby the mirror surface 222b is formed.

The method of forming the mounting surface 222a is preferably a reactive ion etching (RIE) method of high shape precision. The cut section for mirror surface 222b is preferably formed by dicing by using an angle blade. In the case of crystal substrate made of Si or the like, in particular, it is preferred to dice along the crystal plane.

Mounting position precision depends on the production precision of the sub-mount, and a sufficient production precision can be achieved by a dicing process, so that the light detecting and emitting elements and macromolecular optical waveguide film can be mounted easily. To form a metal film on the cut section, vapor deposition method is preferred.

The electrode films 230a, 230b, 230c, 230d are formed by vapor-depositing a metal film of gold (Au), aluminum (Al) or the like on the surface of sub-mount 222, and patterning this metal film by the technology of photolithography.

Figure 12A:
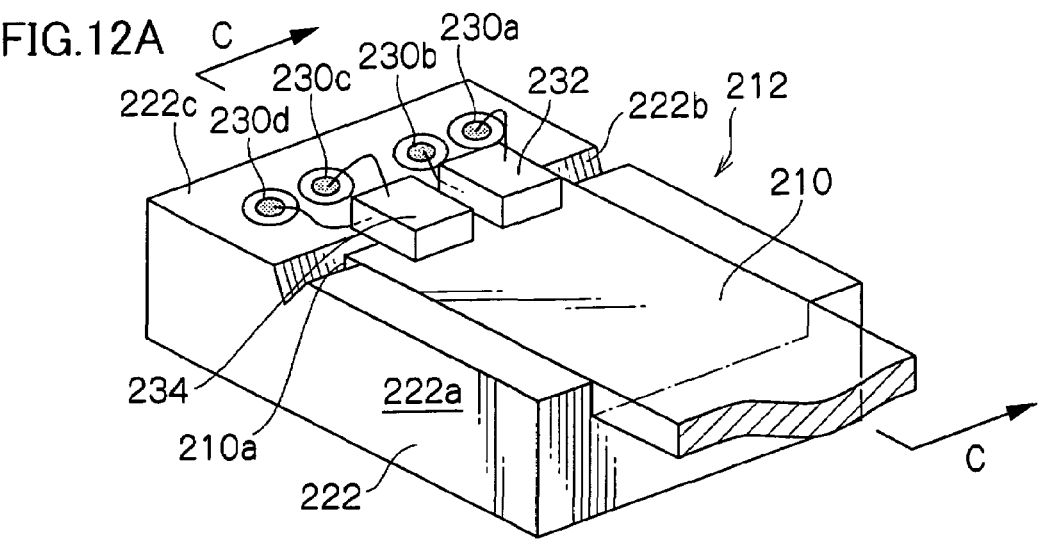
FIG. 12A is a perspective view of optical transmission and reception section in the second embodiment.
Figure 12B:
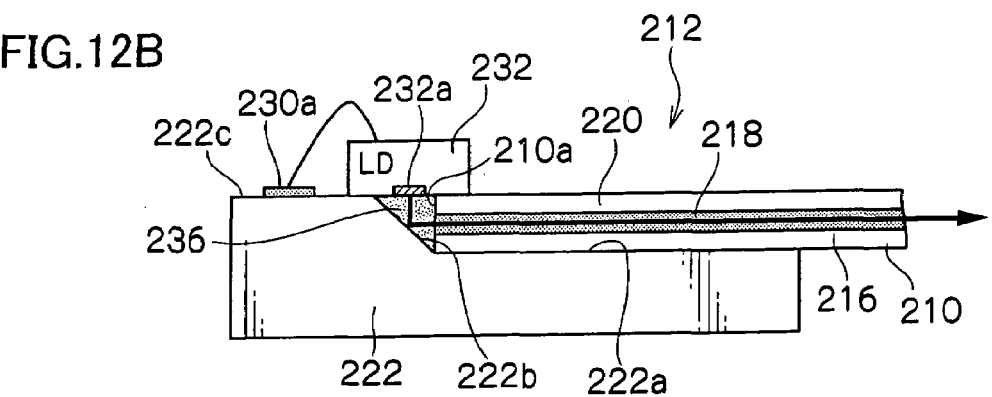
FIG. 12B is a sectional view taken along C-C of FIG. 12A.
Figure 12C:
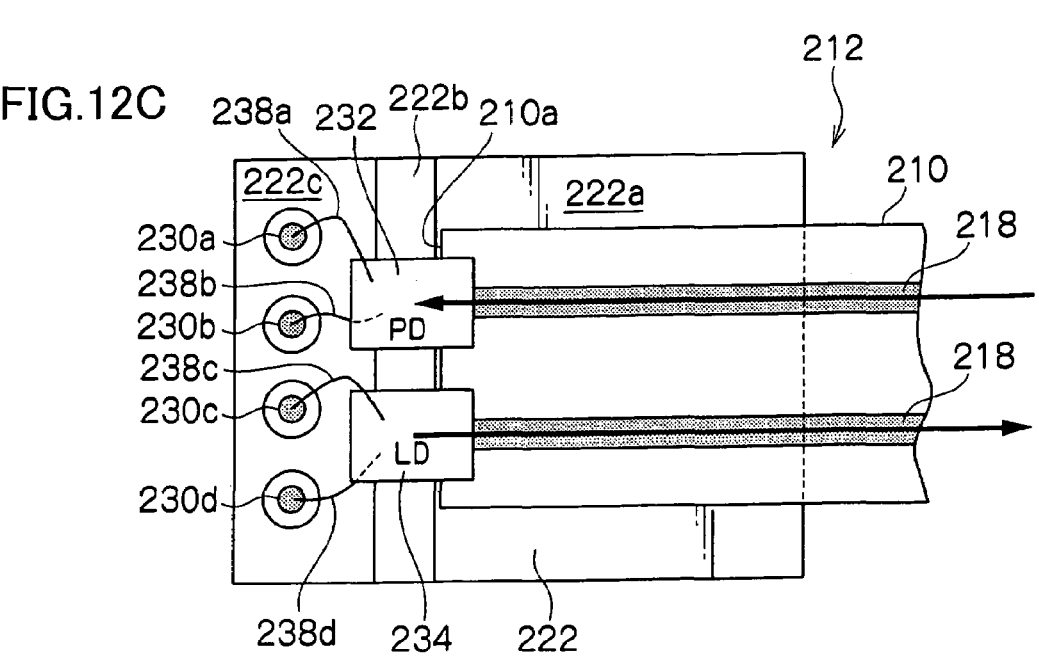
FIG. 12C is a plan view of FIG. 12B.

Referring next to FIGS. 12A to 12C, a mounting state of optical transmission and reception section 212 is explained. FIG. 12A is a plan view of optical transmission and reception section 212, FIG. 12B is a sectional view taken along C-C (i.e., a sectional view along optical axis of optical waveguide) of FIG. 12A, and FIG. 12C is a partially enlarged view showing an optical coupler in FIG. 12B.

When mounting the light transmission and reception module, the LD 232, PD 234, and macromolecular optical waveguide film 210 are held on the sub-mount 222 of the optical transmission and reception section 212. The end of macromolecular optical waveguide film 210 is mounted on the sub-mount 222 so that the film surface 210c at the light incident and exit side surfaces is opposite to the mounting surface 222a of the sub-mount 222. Thus, by holding the macromolecular optical waveguide film 210 on the mounting surface 222a, the flexible macromolecular optical waveguide film 210 can be held stably.

The LD 232 and PD 234 are provided above the mirror surface 222b with the light emitting part 232a and light detecting part 234a directed to the side of the sub-mount 222.

For example, by controlling the thickness of the macromolecular optical waveguide film 210, without using micro lens, the alignment can be achieved, such that the light emitted from the light emitting part 232a of the LD 232 is reflected by the mirror surface 222b and made incident on the end surface (incident end surface) of the core 218 of optical guide path for transmission of the macromolecular optical waveguide film 210, and the light emitted from the end surface (exit end surface) of the core 218 of the optical waveguide for reception is reflected by the mirror surface 222b, and is received in the light detecting part 234a of the PD 234.

The LD 232 and PD 234 are fixed to the sub-mount 222 and macromolecular optical waveguide film 210 by means of adhesive 236. The adhesive 236 may be photosetting adhesive such as ultraviolet curable resin, or thermosetting resin, but in order to reduce the optical loss, it is preferred to use a material having the same refractive index as in the core 218 of the macromolecular optical waveguide film 210. By using the material having the same refractive index as the core 218, the spreading angle of the light detecting and emitting elements becomes smaller, which causes a good effect.

When the mirror surface is formed in the macromolecular optical waveguide film 210, it is necessary to prevent the adhesive from sticking to the mirror surface, and it is hard to fix the light detecting and emitting elements by adhesive. However, by forming he mirror surface 222b in the sub-mount 222, the LD 232 and PD 234 can be fixed easily by adhesive.

The lower electrode of LD 232 is electrically connected to the electrode film 230a by wire 238a, and upper electrode of LD 232 is electrically connected to the electrode film 230b by wire 238b. Similarly, the lower electrode of PD 234 is electrically connected to the electrode film 230c by wire 238c, and upper electrode of PD 234 is electrically connected to the electrode film 230d by wire 238d. The electrodes provided at the side of light emitting part 232a of LD 232 and at the side of light receiving part 234a of PD 234 are upper electrodes, and the electrodes provided at the back side of LD 232 and PD 234 are lower electrodes.

Herein, the optical waveguide for transmitting an optical signal from the optical transmission and reception section 212 is the optical waveguide for transmission, and the optical waveguide for receiving an optical signal from the optical transmission and reception section 212 is the optical waveguide for reception. As seen from the optical transmission and reception section 214, needles to say, the optical waveguide for transmission and optical waveguide for reception are inverted.

The optical transmission and reception section 212 can be assembled easily, by mounting the macromolecular optical waveguide film 210 on the mounting surface 222a of the sub-mount 222 and then fitting the LD 232 and PD 234 thereon.

[Operation of Light Transmission and Reception Module]

Referring to FIG. 13, the operation of the light transmission and reception module of the embodiment is explained. FIG. 13 is a view schematically showing a structure of schematic configuration of light transmission and reception module. Herein, it is supposed that the optical waveguide for transmitting an optical signal from the optical transmission and reception section 212 is the optical waveguide for transmission, and the optical waveguide for receiving an optical signal from the optical transmission and reception section 212 is the optical waveguide for reception.

In the light transmission and reception module of the embodiment, when transmitting an optical signal from the optical transmission and reception section 212 to the optical transmission and reception section 214, the light emitted from the LD 232 held on the sub-mount 222 of the optical transmission and reception section 212 is reflected by the mirror surface 222b and coupled to the incident end surface of the core 218 of optical waveguide for transmission, and is guided in the optical waveguide for transmission formed in the macromolecular optical waveguide film 210. The light emitted from the exit end surface of the core 218 of optical waveguide for transmission is reflected by the mirror surface 222b and received in the PD 234 held in the sub-mount 224 of the optical transmission and reception section 214.

Similarly, when receiving an optical signal transmitted from the optical transmission and reception section 214 by the optical transmission and reception section 212, the light emitted from the LD 232 held in the sub-mount 224 of the optical transmission and reception section 214 is reflected by the mirror surface 222b and coupled to the incident end surface of the core 218 of optical waveguide for reception, and is guided in the optical waveguide for reception formed in the macromolecular optical waveguide film 210. The light emitted from the exit end surface of the core 218 of optical waveguide for reception is reflected by the mirror surface 222b and received in the PD 234 held in the sub-mount 222 of the optical transmission and reception section 212.

As explained herein, in the light transmission and reception module of the embodiment, light communication is exchanged in two directions between a set of optical transmission and reception sections as mentioned above. As the flexible belt-shaped macromolecular optical waveguide film has a property of following up deformation such as bending, folding or twisting, although the film is deformed, optical signal can be transmitted and received by way of optical waveguide formed in the macromolecular optical waveguide film. Therefore it can be used in optical wiring of often-bent-and-folded connection of cellphone, slim personal computer or mobile appliance.

In the light transmission and reception module of the embodiment, since the electrode films are formed at the sub-mount side, when installing the light transmission and reception module in a package, electrical wiring can be easily produced in the light detecting element and light emitting element of the optical transmission and reception section.

In the light transmission and reception module of the embodiment, moreover, since the sub-mount processed in a specified shape and having a mirror surface is used, as shown in (1) to (4) below, it is easier to mount the macromolecular optical waveguide film, light emitting element and light detecting element.

(1) The sub-mount has a mounting surface for mounting the end of macromolecular optical waveguide film, and the macromolecular optical waveguide film is held on the surface by this mounting surface, so that the flexible macromolecular optical waveguide film can be stably held on the sub-mount.

(2) The macromolecular optical waveguide film is mounted on the sub-mount, a mirror surface is formed in the same sub-mount, and the light detecting and emitting elements and macromolecular optical waveguide film are optically coupled by way of this mirror surface. Since the mounting process is carried out by such a simple and easy method, the number of parts can be significantly reduced.

(3) Sufficient precision can be obtained by using a dicing saw when forming a mirror surface on the sub-mount, which makes mounting much easier.

(4) as the parts are aligned by controlling the thickness of the macromolecular optical waveguide film, mounting is possible without using micro lens.

[Other Module Configuration]

In this embodiment, the light transmission and reception module is intended to exchange optical communications in two directions between the optical transmission and reception sections each including a light emitting element and a light detecting element. However, the light transmission and reception module may be designed to make optical communications in one direction between the optical transmitter having the light emitting element and the optical receiver having the light detecting element.

As the LD and PD, flip-chip type elements to be connected electrically to the electrode films by bumps or the like may be used. By using flip-chip type elements, wire bonding is not required and mounting is easier. Hence, the module excellent in mass producibility can be presented.

EXAMPLES

The present invention is more specifically described below by referring to examples, but the invention is not limited to these examples.

Example 1

<Production of Macromolecular Optical Waveguide Film>

A thick film resist (SU-8 of Microchemical) is applied on Si substrate by spin coating, prebaked at 80 deg. C., exposed through photo mask, and developed, and four projecting portions of square section (width: 50 μm, height: 50 μm, length: 80 mm) are formed. Interval of projecting portions is 250 μm. By post baking at 120 deg. C., a master plate for forming macromolecular optical waveguide is produced.

A releasing agent is applied on the master plate, and a mixture of thermosetting liquid dimethyl siloxane rubber (SYLGARD184 of Dow-Corning Asia, viscosity 5000 mPa.s) and its hardening agent is poured thereon, and heated and cured for 30 minutes at 120 deg. C. After releasing, a die (die thickness: 5 mm) having a recess corresponding to the projection portion of a rectangular section is produced.

Further, a through-hole of circular top view, having a section tapered in mold thickness direction, is formed by punching to communicate with the recess at one end and other end of the recess, whereby a mold is produced.

This mold is adhered tightly to a film base material for clad (Arton Film of JSR Co., refractive index 1.510) of film thickness of 50 μm, which is one size larger than the mold. A few drops of ultraviolet curable resin of viscosity of 500 mPa.s are dropped into supply side through-hole of the mold, and the discharge side (i.e., the evacuating and sucking side) through-hole is evacuated and sucked, such that the recess is filled with ultraviolet curable resin in 10 minutes. It is cured by emitting ultraviolet light of 50 mW/cm$^2$ irradiated from above the mold for 5 minutes, and the mold is separated from Arton Film, whereby a core of same shape as projecting portion of master plate is formed on the Arton Film.

On the core forming side of Arton film, ultraviolet curable resin of which refractive index after curing is 1.510, which is the same as that of Arton Film, is applied by coating. A film base material for clad of 50 μm is attached thereto, and ultraviolet light of 50 mW/cm$^2$ is irradiated thereon for 5 minutes to cure, such that two films are adhered and a belt-shaped macromolecular optical waveguide film of 1.5 mm in width and 150 μm in thickness is obtained. The bending radius tolerance of macromolecular optical waveguide film is 2 mm.

Using a dicing saw, both ends of this macromolecular optical waveguide film are cut off vertically with respect to the optical axis, whereby a macromolecular optical waveguide film having vertical cut sections at both ends is obtained.

<Production of Sub-Mount>

On Si substrate of 600 μm in thickness, a step of 160 μm in height for mounting macromolecular optical waveguide film is formed by RIE. Using a dicing saw with a Si blade angled by 45 degrees, a step of 260 μm in height is cut off at an angle of 45 degrees with respect to the optical axis, whereby a 45-degree mirror surface is formed in the sub-mount. After vapor-depositing Au in a thickness of 200 nm on the top surface of sub-mount, Au electrode is patterned by photolithography, and an electrode pad for upper electrode and an electrode pad for lower electrode are formed. By cutting off the Si substrate having these electrode pads, Si sub-mount is formed.

<Mounting of Module>

After positioning both ends of the macromolecular optical waveguide film, these ends are mounted on mounting surfaces of different Si sub-mounts, and fixed on the sub-mounts by using ultraviolet curable resin for core.

Cathode electrode and anode electrode of flip-chip type VCSEL element, and electrode pads on Si sub-mount are bonded by flip-chip individually. Further, cathode electrode and anode electrode of photo diode element, and electrode pads on Si sub-mount are bonded by flip-chip, repsectively. As a result, VCSEL element and photo diode element are electrically connected to electrode pads, and a two-way light transmission and reception module of example 1 having a pair of optical transmission and reception sections and macromolecular optical waveguide film is obtained.

<Evaluation of Communication Performance>

By driving VCSEL element by 3 mA current and making the element emit light at 1 mW, performance of light transmission and reception is evaluated by using sampling oscilloscope (Agilent 86100C of Agilent Technologies) and pulse pattern generator. The two-way light transmission and reception module of example 1 is proved to exhibit excellent eye patterns up to 3.125 Gbps, although the belt-shaped macromolecular optical waveguide film is bent, folded and twisted as shown in FIG. 2A and FIG. 2B relating to the first embodiment.

Example 2

<Production of Macromolecular Optical Waveguide Film>

A macromolecular optical waveguide film is produced in the same procedure as in example 1.

<Production of Sub-Mount>

Si sub-mount is produced in the same procedure as in example 1.

<Mounting of Module>

VCSEL element and photo diode element are electrically connected to electrode pads in the same procedure as in example 1, except that: upper electrode of VCSEL element and upper electrode of photo diode element, and electrode pads on a Si sub-mount are bonded by flip-chip; and therefore the lower electrode of VCSEL element and lower electrode of photo diode element, and electrode pads on Si sub-mount are bonded by using Au wire. As a result, a two-way light transmission and reception module of example 2 having a pair of optical transmission and reception sections and macromolecular optical waveguide film is obtained.

<Evaluation of Communication Performance>

By driving VCSEL element by 3 mA current and making the element emit light at 1 mW, performance of light transmission and reception is evaluated by using sampling oscilloscope (Agilent 86100C of Agilent Technologies) and pulse pattern generator. The two-way light transmission and reception module of example 1 is proved to exhibit excellent eye patterns up to 3.125 Gbps, although the belt-shaped macromolecular optical waveguide film is bent, folded and twisted as shown in FIG. 2A and FIG. 2B relating to the first embodiment.

Example 3

A two-way light transmission and reception module of example 3 is produced in the same procedure as in example 1, except that the module is made by using a quartz glass sub-mount formed by using quartz glass substrate of 600 μm in thickness instead of Si substrate of 600 μm in thickness.

By driving VCSEL element by 3 mA current and making the element emit light at 1 mW, performance of light transmission and reception is evaluated by using sampling oscilloscope (Agilent 86100C of Agilent Technologies) and pulse pattern generator. The two-way light transmission and reception module of example 3 is proved to exhibit excellent eye patterns up to 3.125 Gbps if the belt-shaped macromolecular optical waveguide film is bent, folded and twisted as shown in FIG. 2A and FIG. 2B relating to the first embodiment.

Example 4

A two-way light transmission and reception module of example 4 is produced in the same procedure as in example 2, except that the module is made by using a quartz glass sub-mount formed by using quartz glass substrate of 600 μm in thickness instead of Si substrate of 600 μm in thickness.

By driving VCSEL element by 3 mA current and make the element emit light at 1 mW, performance of light transmission and reception is evaluated by using sampling oscilloscope (Agilent 86100C of Agilent Technologies) and pulse pattern generator. The two-way light transmission and reception module of example 4 is proved to exhibit excellent eye patterns up to 3.125 Gbps, although the belt-shaped macromolecular optical waveguide film is bent, folded and twisted as shown in FIG. 2A and FIG. 2B relating to the first embodiment.

As shown in these examples 1 to 4, in the light transmission and reception module of the invention, since the belt-shaped macromolecular optical waveguide film has a high flexibility, if the film is deformed by bending, folding or twisting, the optical signal can be reliably transmitted and received through the optical waveguide formed in the macromolecular optical waveguide film. The mounting process requires only mounting the macromolecular optical waveguide film on the mounting surface formed in the sub-mount and fitting the light emitting and detecting elements thereto. Thus, the constituent components can be positioned, and mounted very easily and reliably.

Third Embodiment

Referring now to the drawings, a third embodiment of the invention is specifically described below.

[Manufacturing Method of Sub-Mount]

A method of manufacturing a sub-mount of the invention comprises (1) a mold production step of producing a mold having projections and recesses for copying the surface configuration of a sub-mount, (2) a filling step of filling the produced mold with curing material, (3) a curing step of curing the applied curing material, and (4) a releasing step of separating a copied sub-mount from the mold.

A method of producing a mold includes (A) a method of producing a mold by curing liquid silicone rubber on master plate of sub-mount, (B) a method of producing a mold by etching a silicon substrate, and (C) a method of producing a mold by casting a metal. The manufacturing method of the sub-mount using the mold produced in method (A) will be referred to as "the duplication method using silicone resin" hereinafter, and the manufacturing method of sub-mount using the mold produced by method (B) or (C) will be referred to as "the stamper method" hereinafter.

Duplication Method Using Silicone Resin

Figure 14A:
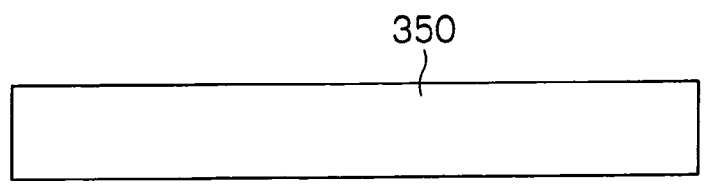
FIGS. 14A to 14F are process diagrams of method of manufacturing sub-mount in the third embodiment.
Figure 14B:
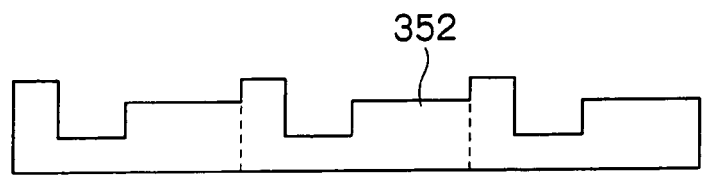

An overall picture of duplication method using silicone resin is explained by referring to FIGS. 14A to 14F. FIG. 14A shows a silicon substrate 350. Projections and recesses are formed on the main surface of the silicon substrate 350 by RIE, and a master plate 352 of sub-mount is produced (see FIG. 14B). By precision processing technology such as RIE, the master plate 352 of sub-mount is produced precisely. Projections and recesses corresponding to a plurality of sub-mounts are formed in the master plate, and by using this mater plate, a plurality of sub-mounts can be copied simultaneously.

Figure 14C:
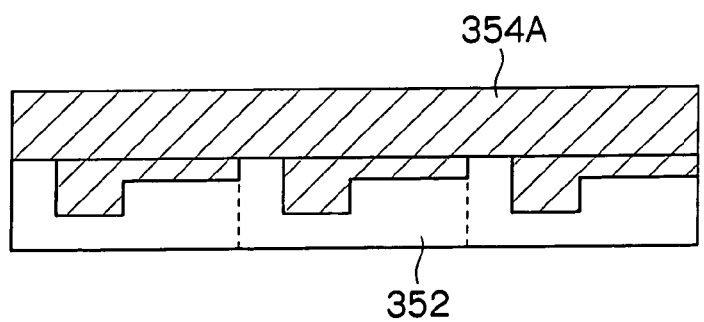
Figure 14D:
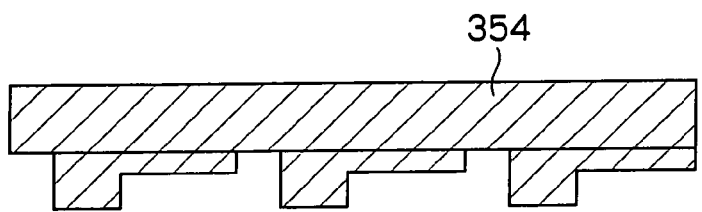

Liquid silicone rubber is applied or poured onto the projection and recess forming surface of the master plate 352, and cured (see FIG. 14C). Then the silicone resin layer 54A is peeled off, and a silicone resin mold 354 having projections and recesses is obtained, which projections and recesses copy the surface configurations of the sub-mount (see FIG. 14D). By using the liquid silicone rubber and making use of the adhering and releasing properties of this material, projections and recesses of the master plate 352 are copied accurately. These steps correspond to the mold production step.

Figure 14E:
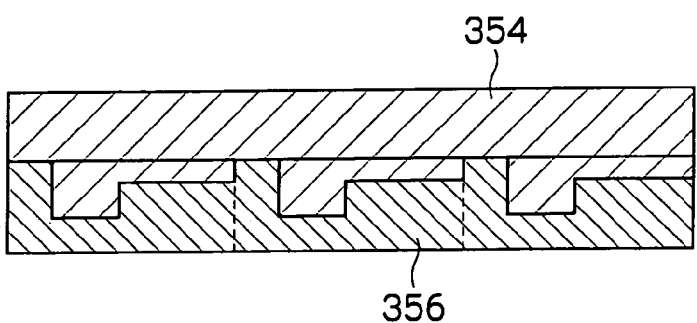
Figure 14F:
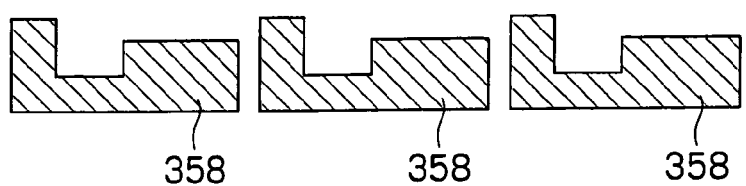

The mold 354 is filled with ultraviolet curable resin, and cured by ultraviolet irradiation (see FIG. 14E). These steps correspond to the filling step and curing step. Then, by separating the cured resin layer 356 from the mold 354, projections and recesses of the sub-mount surface are copied. This step corresponds to the releasing step. By dicing this duplicate (not shown) into individual sub-mounts, sub-mounts 358 of ultraviolet cured resin having projections and recesses on the surface are obtained (see FIG. 14F).

The principal steps of the duplication method using silicon resin are more specifically described below.

(Production of Master Plate)

The above example is for producing a master plate of sub-mount by etching a silicon substrate by RIE method. However, the material of master plate is not limited to silicon substrate, but may be glass substrate such as quartz glass substrate, and metal substrate such as nickel (Ni) substrate, and the like. For production of master plate, conventional methods such as photolithography may be employed without any limitation. The mirror surface can be produced by dicing. Moreover, the electrodeposition or photoelectrodeposition previously filed by the present applicant (Japanese Patent Application No. 2002-10240) is also applicable for production of master plate.

(Production of Mold)

In the duplication method using silicone resin, as mentioned above, liquid silicone rubber is applied or poured onto the projection and recess forming surface of the produced master plate, dried as required, and cured, and a silicone resin layer is formed. By separating the silicone resin layer from the master plate, a mold copying the surface configuration of the sub-mount is produced.

The thickness of the silicone resin layer is properly determined in consideration of handling performance of the mold, but in general it is suitably set to be about 0.1 to 50 mm. Preferably, the master plate should be coated in advance with releasing agent or the like to facilitate releasing from the mold.

The liquid silicone rubber is curing organopolysiloxane, which becomes silicone rubber after curing, and the term "liquid" includes paste or viscous substances. The liquid silicone rubber preferably contains methyl siloxane group, ethyl siloxane group, or phenyl siloxane group in its molecule. Among liquid silicone rubber materials, liquid dimethyl siloxane rubber (polydimethyl siloxane: PDMS) is particularly preferable from the viewpoint of adhesion, releasing property, strength and hardness.

The liquid silicone rubber is excellent in both adhesion and separation, which are contradictory properties, and has a capability of copying fine configuration. Accordingly, the mold using silicone rubber is capable of copying the original plate at high precision, and it is easy to separate the mold from the ultraviolet curable resin for forming a sub-mount described later. Advantages of liquid silicone rubber mold include sufficient mechanical strength and dimensional stability as mold (which is to be used repeatedly), and stiffness (hardness) for retaining the projected and recessed configurations. From this mold, therefore, sub-mounts retaining the shape at high precision can be produced very easily.

The liquid silicone rubber is preferred to be of two-pack type used together with hardening agent. Above all, the addition type liquid silicone rubber is preferred because it is cured uniformly both at the surface and the inside in a short time, free from by products or produces few byproducts, is excellent in releasing property and small in shrinkage rate. As required, various additives may be added to the liquid silicone rubber.

The liquid silicone rubber can be applied or poured on the surface of master plate, and since the projections and recesses formed on the master plate must be copied accurately, the viscosity is preferred to be less than a certain level. The viscosity of liquid silicone rubber is preferred to be about 500 mPa.s to 7000 mPa.s, or more preferably about 2000 mPa.s to 5000 mPa.s. For adjusting the viscosity, a solvent may be added slightly so as not to express adverse effects of the solvent.

The surface energy of mold is 10 dyn/cm to 30 dyn/cm, preferably 15 dyn/cm to 24 dyn/cm, from the viewpoint of adhesion to the resin. The surface energy can be analyzed by measuring the contact angle between solid and liquid, and hence it is measured by a specified contact angle measuring apparatus. Share rubber hardness of mold is 15 to 80, preferably 20 to 60, from the viewpoint of die patterning performance, retaining of undulated shape and releasing property. Share rubber hardness can be measured by using spring type rubber durometer for measuring an amount of deformation when a surface of the object is pushed by a needle and made deformed. Surface roughness of mold (maximum height: Ry) is set to be 0.2 µm or less, preferably 0.1 µm (100 nm) or less, from the viewpoint of die patterning performance. Surface roughness Ry is a value expressing maximum height defined by the difference of maximum value and minimum value of roughness curve, and can be measured by probe type film thickness gauge.

The mold is preferred to be light transmittable in ultraviolet ray region and/or visible ray region. The mold is preferred to be light transmittable in visible ray region because the state of filling the mold with resin can be observed, and completion of filling is easily confirmed. The mold is preferred to be light transmittable in ultraviolet ray region because ultraviolet curing is achieved by making ultraviolet transmit through the mold. The transmittance of the mold in ultraviolet ray region (250 nm to 400 nm) is preferred to be 80% or more.

(Duplication of Sub-mount)

In the duplication method using silicon resin, as mentioned above, the mold copying the surface configuration of the sub-mount is filled with ultraviolet curable resin for forming a sub-mount, the applied resin is cured, and the cured resin layer is separated from the mold, so that a sub-mount forming projections and recesses on the surface can be copied.

As the ultraviolet curable resin for forming a sub-mount, a resin of high heat resistance is preferred, and epoxy based and polyimide based UV curable resins are preferably used as the ultraviolet curable resin. Also, monomer, oligomer, or mixture of monomer and oligomer of ultraviolet curing type may be preferably used.

The ultraviolet curable resin is required to be sufficiently low in viscosity so as to fill up the projections and recesses of the mold. Therefore, the viscosity of ultraviolet curable resin is preferably 10 mPa.s to 2000 mPa.s, more preferably 20 mPa.s to 1000 mPa.s, and most preferably 30 mPa.s to 500 mPa.s.

To reproduce the projections and recesses formed on the master plate at high precision, it is required that the volume change is small before and after curing of ultraviolet curable resin. The volume change is preferred to be 10% or less, or more preferably 6% or less. It is preferred to avoid lowering the viscosity by using a solvent because the volume change before and after curing is very larger.

To reduce volume change (shrinkage) after curing of ultraviolet curable resin, a polymer may be added to the ultraviolet curable resin. The polymer to be added is preferably compatible with ultraviolet curable resin and those not having adverse effects on the resin refractive index, elasticity and light-transmitting properties thereof. By adding the polymer, not only the volume change can be decreased, but also the viscosity or glass transition point of cured resin can be effectively controlled at advanced level. The polymer includes acrylic system, methacrylic system, epoxy system, and many others.

To cure the ultraviolet curable resin, light is emitted from ultraviolet ray lamp, ultraviolet ray LED, UV irradiation apparatus, in an ultraviolet region (250 nm to 400 nm).

(Stamper Method)

Figure 15A:
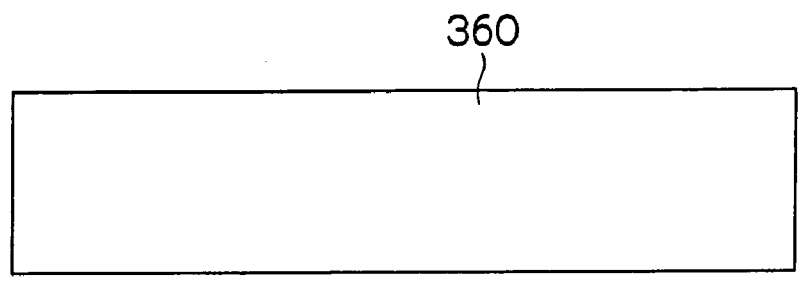
FIGS. 15A to 15D are process diagrams of other method of manufacturing sub-mount in the third embodiment.
Figure 15B:
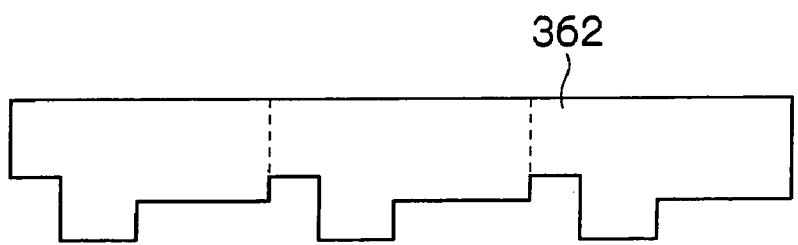

A general picture of stamper method is explained by referring to FIGS. 15A to 15D. In the stamper method, the mold is used as the stamper. FIG. 15A shows a silicon substrate 350. Projections and recesses are formed on the main surface of the silicon substrate 350 by RIE, and a silicon mold 362 is produced (see FIG. 15B). This mold has projections and recesses corresponding to a plurality of sub-mounts, and by using this mold, a plurality of sub-mounts can be copied simultaneously. By precision processing technology such as RIE, the mold 362 accurately copying the projections and recesses of sub-mount can be produced precisely. These steps correspond to the mold production step.

Figure 15C:
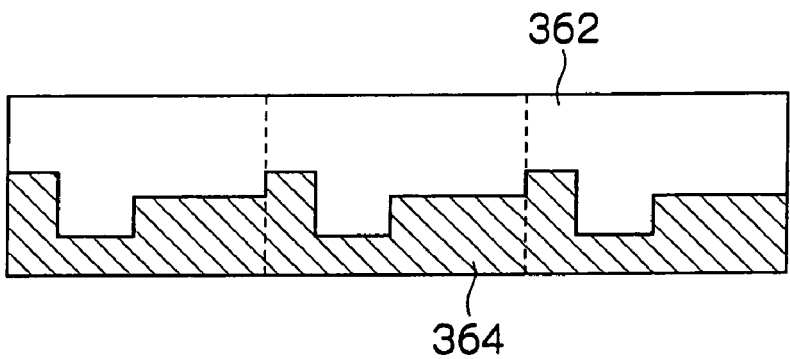
Figure 15D:
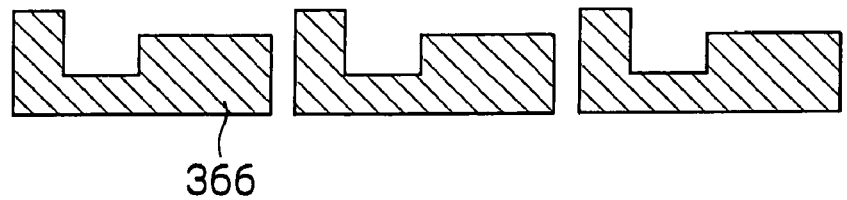

Thermoplastic resin is tightly fitted to the mold 362, and heated and pressurized, and cooled gradually and cured (see FIG. 15C). These steps correspond to the filling step and curing step. Then, by separating the cured resin layer 364 from the mold 362, projections and recesses of the sub-mount surface are copied. This step corresponds to the stripping step. By dicing this duplicate (not shown) into individual sub-mounts, sub-mounts 366 of ultraviolet cured resin having projections and recesses on the surface are obtained (see FIG. 15D).

The principal steps of the stamper method are more specifically described below. Hereinafter, in order to distinguish from the mold used in the duplication method using silicone resin, the mold produced by the Stamper method is herein called the stamper.

(Production of Stamper)

The above example is for producing a stamper by etching a silicon substrate by RIE method. However, the material of stamper is not limited to silicon substrate, but may be glass substrate such as quartz glass substrate, and metal substrate such as nickel (Ni) substrate. For production of stamper, conventional methods such as photolithography may be employed without any limitation. The stamper can be produced also by the electrodeposition or photoelectrodeposition previously filed by the present applicant (Japanese Patent Application No. 2002-10240). The production precision of the mold is enhanced by employing photolithography or RIE.

(Duplication of Sub-mount)

In the stamper method, as mentioned above, the stamper copying the surface configuration of the sub-mount is tightly fitted to thermoplastic resin for forming a sub-mount, and heated and pressurized, and slowly cooled to ordinary temperature until cured. By releasing the cured resin layer from the mold, a sub-mount forming projections and recesses on the surface can be copied.

The thermoplastic resin for forming a sub-mount is desired to be high in heat resistance, and unsaturated polyester resin-based, epoxy resin-based, polyimide-based, PPS (polyphenylene sulfide)-based thermoplastic resins are, in particular, preferably used. Further, ultraviolet curing monomer, oligomer, or mixture of monomer and oligomer may be used. A resin for precision molding obtained by mixing a filler into thermosetting resin is also used preferably. An example of such resin is BMC resin obtained by mixing a filler such as glass fiber in unsaturated polyester resin, to suppress shrinkage.

The thermoplastic resin is preferred to be: high in dimensional precision with the shrinkage rate of 1% or less; with thermal deformation starting temperature of 200 deg. C. or more; close to metal in coefficient of linear expansion; and easily combined with metal parts (smaller than in aluminum).

To form projections and recesses on the thermoplastic resin, the thermoplastic resin adhered to the stamper is heated to temperature about glass transition point (Tg)+50 deg. C., and pressurized at pressure of about 10 N.

In the stamper method, instead of thermoplastic resin, low melting point glass which softens at 600 deg. C. or less may be used. For example, by heating low melting point glass to about 500 deg. C. and by using a metal die as stamper, a glass sub-mount can be copied. Further, a glass material of high melting point of 800 deg. C., such as Pyrex (registered trademark) glass, is deformed by heating to about 650 deg. C. and pressurizing, to effect copying by stamper method.

[Light Transmission and Reception Module]

An example of configuration of light transmission and reception module of this embodiment using the sub-mount manufactured in the above-described manufacturing method includes the configuration of the first embodiment in FIGS. 3A to 3C.

In this case, the light transmission and reception module comprises, as shown in FIGS. 3A to 3C, a belt-shaped macromolecular optical waveguide film 10, and optical transmission and reception sections 12, 14 for transmitting and receiving an optical signal through an optical waveguide formed in the macromolecular optical waveguide film 10. The optical transmitter 12 has a sub-mount 22, and one end of the macromolecular optical waveguide film 10 is held on the sub-mount 22. The optical transmission and reception section 14 has a sub-mount 24, and other end of the macromolecular optical waveguide film 10 is held on the sub-mount 24.

The macromolecular optical waveguide film 10 is a flexible transparent film of bending radius of 3 mm or less, and it is capable of following up deformation such as bending, folding or twisting as shown in FIGS. 4A and 4B relating to the first embodiment. Accordingly, although the film is deformed, the optical signal transmitted from the optical transmission and reception section 12 is received in the optical transmission and reception section 14, by being guided in the optical waveguide formed in the macromolecular optical waveguide film 10. The resin material used in the macromolecular optical waveguide film 10 is same as in the first embodiment.

Thickness of macromolecular optical waveguide film 10 is desired to be in a range of 50 µm to 300 µm in order to enhance the follow-up property to deformation, and more preferably 100 µm to 200 µm. By the same reason, the film thickness is preferably 0.5 mm to 10 mm, or more preferably 1 mm to 5 mm.

Other features of the macromolecular optical waveguide film of the embodiment are same as in the macromolecular optical waveguide film 10 of the first embodiment, and explanation is omitted.

However, surface energy of the mold used in the mold production step is 10 dyn/cm to 30 dyn/cm, preferably 15 dyn/cm to 24 dyn/cm, from the viewpoint of adhesion with the base film. Share rubber hardness of mold is 15 to 80, preferably 20 to 60, from the viewpoint of pattern copying performance or retaining of recess shape, and releasing property. Surface roughness of mold (maximum height Ry is 0.2 µm or less, preferably 0.1 µm or less, from the viewpoint of pattern copying performance.

The sub-mount 22 of the embodiment (same in configuration as the sub-mount of the first embodiment) can be produced accurately, by precisely copying the notch 26 and recess 28 in the silicon (Si) substrate, according to the manufacturing method of sub-mount of the invention employing the duplication technology by mold. Electrode films 30a, 30b, 30c, 30d are formed by vapor-depositing a metal film of gold (Au), aluminum (Al) or the like on the surface of sub-mount 22, and patterning this metal film by the technology of photolithography.

The optical transmission and reception section 12 of the embodiment can be assembled easily by fitting LD 32 and PD 34 into the recess 28 of sub-mount 22, and fitting the macromolecular optical waveguide film 10 into the notch 26 of sub-mount 22. In this embodiment, the optical waveguide of macromolecular optical waveguide film 10 and the notch 26 of sub-mount 22 are produced precisely by the duplication technology using the mold, and therefore the macromolecular optical waveguide film 10 can be mounted precisely on the sub-mount 22.

In the embodiment, the macromolecular optical waveguide film 10 is made of a transparent resin, and the end position of the core 18 of the optical waveguide can be observed by making use of back surface reflection by the mirror 10*b*. Hence, by making use of back surface reflection image by the mirror 10*b*, alignment of LD 32 and PD 34 is made easier, and mounting at high precision is possible by passive alignment.

In the light transmission and reception module of the embodiment, since the sub-mount processed in a specified shape is used, as shown in (1) to (4) below, it is easy to mount the macromolecular optical waveguide film, light emitting element and light detecting element.

(1) The sub-mount has a notch having a mounting surface for mounting the end of macromolecular optical waveguide film, and the macromolecular optical waveguide film is held on this mounting surface (i.e., on a surface), so that the flexible macromolecular optical waveguide film can be stably held on the sub-mount.

(2) A poking surface for positioning is formed on the end surface of macromolecular optical waveguide film, and the sub-mount has a notch with an abutting surface for abutting against this poking surface. Thus, the macromolecular optical waveguide film can be mounted easily by making use of this abutting surface. In this case, by forming the notch at high precision by duplication technology using the mold, the mounting precision of macromolecular optical waveguide film can be enhanced.

(3) Since the sub-mount has a recess for holding the light emitting element and light detecting element, only by fitting the light emitting element and light detecting element in this recess, the light emitting element and light detecting element can be mounted easily. In this case, by forming the recess precisely by duplication technology using the mold, the mounting precision of light emitting element and light detecting element can be enhanced. Besides, by fitting the light emitting element and light detecting element into the recess formed in the sub-mount, the optical transmission and reception section is made compact.

(4) Usually, by providing a cut angle of 45 degrees in the macromolecular waveguide, the light is totally reflected and it is hard to recognize the position of the core of the waveguide by observing the reflected light or transmitted light. Hence, when a cut angle of 45 degrees is imparted to the core of the waveguide, it is difficult to align the waveguide with the light emitting and detecting elements, whereby active alignment is necessitated. In this embodiment, by contrast, since a transparent macromolecular optical waveguide film is used, the position of 45-degree face of the waveguide core can be observed by back surface reflection image, and by using such back surface reflection image, the light emitting element and light detecting element can be mounted at high precision by passive alignment.

In this embodiment, aside from the module configuration corresponding to the module configuration of the first embodiment, the module configuration corresponding to the module configuration of the second embodiment may be also employed.

EXAMPLES

The invention is more specifically described below by referring to examples, but the invention is not limited to these examples alone.

Example 1

Example 1 is an example of producing a light transmission and reception module, which is the same as the light transmission and reception module shown in FIGS. 3A to 3C, by producing a resin-made sub-mount by the duplication method using silicon resin.

<Production of Macromolecular Optical Waveguide Film>

A thick film resist (SU-8 of Microchemical) is applied on Si substrate by spin coating, prebaked at 80 deg. C., exposed through photo mask, and developed, and four projecting portions of square section (width: 50 µm, height: 50 µm, length: 80 mm) are formed. Interval of projecting portions is set to be 250 µm. By post baking at 120 deg. C., a master plate for forming macromolecular optical waveguide is produced.

A releasing agent is applied on the master plate, and a mixture of thermosetting liquid dimethyl siloxane rubber (SYLGARD184 of Dow-Corning Asia, viscosity 5000 mPa.s) and its hardening agent is poured in, and heated and cured for 30 minutes at 120 deg. C. After releasing, a die (die thickness: 5 mm) having a recess corresponding to the projecting portion of a rectangular section is produced.

Further, a through-hole of circular top view, having a section tapered in mold thickness direction is formed by punching to communicate with the recess at one end and other end of the recess, whereby a mold is produced.

This mold is adhered tightly to a film base material for clad (Arton Film of JSR Co., refractive index 1.510) of film thickness of 50 µm, which is one size larger than the mold. A few drops of ultraviolet curable resin of viscosity of 500 mPa.s are dropped into supply side through-hole of the mold, and the discharge side (i.e., the evacuating and sucking side) through-hole is evacuated and sucked, such that the recess is filled with ultraviolet curable resin in 10 minutes. It is cured by emitting ultraviolet light of 50 mW/cm$^2$ irradiated from above the mold for 5 minutes, and the mold is separated from Arton Film, whereby a core of same shape as projecting portion of master plate is formed on the Arton Film.

On the core forming side of Arton film, ultraviolet curable resin of which refractive index after curing is 1.510, which is the same as that of Arton Film, is applied by coating. A film base material for clad of 50 µm is attached thereto, and ultraviolet light of 50 mW/cm$^2$ is irradiated thereon for 5 minutes to cure, such that two films are adhered and a belt-shaped macromolecular optical waveguide film of 1.5 mm in width and 180 µm in thickness is obtained.

Using a dicing saw with a Si blade angled by 45 degrees, both ends of this macromolecular optical waveguide film are cut off at an angle of 45 degrees with respect to the optical axis, such that a core having a 45-degree mirror surface is exposed. The clad portion is cut off vertically to the optical axis at a position of 50 µm from the leading end, and a macromolecular optical waveguide film having 45-degree mirror surface and vertical cut section at both ends is obtained.

<Production of Sub-Mount>

On Si substrate of 600 µm in thickness, two recesses for mounting light emitting element and light detecting element are formed by RIE. The depth of recess is 250 µm. Further, to mount the macromolecular optical waveguide film, a notch of 50 µm in depth having an abutting surface abutting against the vertical cut section of macromolecular optical waveguide film is formed by RIE method. The Si master substrate having the recesses and notch is prepared as master plate of sub-mount. In this master plate, recesses and notches for a plurality of sub-mounts are formed, and by using this master plate, a plurality of sub-mounts can be copied simultaneously.

On this master plate, a mixture of thermosetting liquid dimethyl siloxane rubber (SYLGARD184 of Dow-Corning Asia, viscosity 5000 mPa.s) and its hardening agent is poured in, and heated and cured for 30 minutes at 120 deg.

C. After releasing, a silicone resin mold (die thickness: 5 mm) having projections and recesses corresponding to the projections and recesses of the master plate on the surface is produced.

Ultraviolet curable resin (of NTT-AT) with viscosity of 3000 mPa.s is applied, and ultraviolet light of 50 mW/cm$^2$ is irradiated from above the mold for 5 minutes to cure, and the cured resin layer is released from the mold. After vapor-depositing Au in a thickness of 200 nm on the cured resin layer, the Au electrode is patterned by photolithography, whereby an electrode pad for lower electrode extending from bottom surface to side surface of each recess up to the top surface of sub-mount, and an electrode pad for upper electrode insulated from this electrode pad, are formed. By cutting the cured resin layer having electrode pads by using a dicer, a plurality of sub-mounts A made of ultraviolet curable resin is formed.

Production error of projections and recesses as seen from the master substrate is within 100 nm, and sub-mounts A made of ultraviolet curable resin can be produced at high precision.

<Mounting of Module>

VCSEL element (Fuji Xerox) is placed in the recess for light emitting element of sub-mount A with Sn—Au solder interposed therebetween, and photo diode element is placed in the recess for light detecting element with Sn—Au solder interposed therebetween. By being heated to 250 deg. C., the VCSEL element and the photo diode element are fixed in the specified recesses of the sub-mount A. As a result, the lower electrodes of VCSEL element and photo diode element are electrically connected to electrode pads. The upper electrode of the VCSEL element and the corresponding electrode pad, and the upper electrode of the photo diode element and the corresponding electrode pad are bonded by using Au wire, respectively.

Both ends of macromolecular optical waveguide film having a 45-degree mirror are fitted into different notches of sub-mount A, the vertical cut section is positioned by abutting against the abutting surface of sub-mount A, and macromolecular optical waveguide film is fixed to sub-mount A by using ultraviolet curing agent. As a result, a two-way light transmission and reception module of example 1 having a pair of optical transmission and reception sections and macromolecular optical waveguide film is obtained.

<Evaluation of Communication Performance>

By using sampling oscilloscope (Agilent 86100C of Agilent Technologies) and pulse pattern generator, the performance of light transmission and reception is evaluated in the two-way light transmission and reception module of example 1. Excellent eye patterns can be measured in up to 3.125 Gbps.

Example 2

Example 2 is an example of producing a light transmission and reception module, which is the same as the light transmission and reception module shown in FIGS. 10A to 10C, by producing a resin-made sub-mount by the duplication method using silicon resin.

<Production of Macromolecular Optical Waveguide Film>

A thick film resist (SU-8 of Microchemical) is applied on Si substrate by spin coating, prebaked at 80 deg. C., exposed through photo mask, and developed, and four projecting portions of square section (width: 50 μm, height: 50 μm, length: 80 mm) are formed. Interval of projecting portions is set to be 250 μm. By post baking at 120 deg. C., a master plate for forming macromolecular optical waveguide is produced.

A releasing agent is applied on the master plate, and a mixture of thermosetting liquid dimethyl siloxane rubber (SYLGARD184 of Dow-Corning Asia, viscosity 5000 mPa.s) and its hardening agent is poured in, and heated and cured for 30 minutes at 120 deg. C. After releasing, a die (die thickness: 5 mm) having a recess corresponding to the projecting portion of a rectangular section is produced.

Further, a through-hole of circular top view, having a section tapered in the mold thickness direction, is formed by punching to communicate with the recess at one end and other end of the recess, whereby a mold is produced.

This mold is adhered tightly to a film base material for clad (Arton Film of JSR Co., refractive index 1.510) of film thickness of 50 μm, which is one size larger than the mold. A few drops of ultraviolet curable resin of viscosity of 500 mPa.s are dropped into supply side through-hole of the mold, and the discharge side (i.e., the evacuating and sucking side) through-hole is evacuated and sucked, such that the recess is filled with ultraviolet curable resin in 10 minutes. It is cured by emitting ultraviolet light of 50 mW/cm$^2$ irradiated from above the mold for 5 minutes, and the mold is separated from Arton Film, whereby a core of same shape as projecting portion of master plate is formed on the Arton Film.

On the core forming side of Arton film, ultraviolet curable resin of which refractive index after curing is 1.510, which is the same as that of Arton Film, is applied by coating. A film base material for clad of 50 μm is attached thereto, and ultraviolet light of 50 mW/cm$^2$ is irradiated thereon for 5 minutes to cure, such that two films are adhered and a belt-shaped macromolecular optical waveguide film of 1.5 mm in width and 180 μm in thickness is obtained.

Using a dicing saw, both ends of this macromolecular optical waveguide film are cut off vertically to the optical axis, and a macromolecular optical waveguide film having vertical cut sections at both ends is obtained.

<Production of Sub-Mount>

On a Si substrate of 600 μm in thickness, a mounting surface for mounting a macromolecular optical waveguide film is formed by RIE. The step difference between the substrate surface having electrodes and the mounting surface is 250 μm. Further, after forming a notch by using a blade which is of 200 μm in thickness and angled at 45 degrees, a 45-degree slope is formed between the substrate and mounting surface. The Si master substrate having the mounting surface and slope is thus prepared as master plate of sub-mount. In this master plate, the mounting surfaces and slopes are formed for a plurality of sub-mounts, and by using this master plate, a plurality of sub-mounts can be copied simultaneously.

On this master plate, a mixture of thermosetting liquid dimethyl siloxane rubber (SYLGARD184 of Dow-Corning Asia, viscosity 5000 mPa.s) and its hardening agent is poured in, and heated and cured for 30 minutes at 120 deg. C. After releasing the cured layer, a silicone resin mold (die thickness: 5 mm) having projections and recesses corresponding to the projections and recesses of the master plate on the surface is produced.

Ultraviolet curable resin (of NTT-AT) with viscosity of 3000 mPa.s is applied, and ultraviolet light of 50 mW/cm$^2$ is irradiated from above the mold for 5 minutes to cure, and the cured resin layer is released from the mold. By vapor-depositing Al on the slope of the cured resin layer, a mirror surface is formed. Further, by vapor-depositing Au in a thickness of 200 nm on the cured resin layer, the Au electrode is patterned by photolithography, such that an electrode pad for lower electrode and an electrode pad for upper electrode are formed on the top surface of sub-mount. By cutting the cured resin layer having electrode pads by using a dicer, a plurality of sub-mounts B made of ultraviolet curable resin is formed.

Production error of projections and recesses as seen from the master substrate is within 100 nm, and sub-mounts B made of ultraviolet curable resin can be produced at high precision.

<Mounting of Module>

After positioning the both ends of macromolecular optical waveguide film, these ends are mounted on different mounting surfaces of sub-mount B, and VCSEL element (Fuji Xerox) is placed on the mirror of sub-mount B, and photo diode element is placed thereat. The macromolecular optical waveguide film, VCSEL element and photo diode element are fixed in the sub-mount B by using ultraviolet curable resin for core.

The upper electrode and the lower electrode of the VCSEL element and the corresponding electrode pads are bonded by flip-chip, respectively. The upper electrode and the lower electrode of the photo diode element and the corresponding electrode pads are bonded similarly by flip-chip, respectively. As a result, the VCSEL element and photo diode element are electrically connected to the electrode pads, and a two-way light transmission and reception module of example 2 having a pair of optical transmission and reception sections and macromolecular optical waveguide film is obtained.

<Evaluation of Communication Performance>

By using sampling oscilloscope (Agilent 86100C of Agilent Technologies) and pulse pattern generator, the performance of light transmission and reception is evaluated in the two-way light transmission and reception module of example 2. Excellent eye patterns can be measured in up to 3.125 Gbps.

Example 3

Example 3 is an example of producing a light transmission and reception module having the same configuration as the light transmission and reception module shown in FIGS. 3A to 3C, by producing a resin-made sub-mount by the stamper method. As explained below, the light transmission and reception module is produced in the same procedure as in example 1, except that the sub-mount is produced by stamper method.

<Production of Sub-Mount>

In the same manner as in example 1, Si master substrate is produced. Using this master substrate as stamper (mold), thermoplastic bulk molding compound (BMC) resin is adhered to the stamper, and heated for 2 minutes at 250 deg. C. under pressure of 100 N, and cooled gradually, such that epoxy resin is cured. The cured layer is separated from stamper, and a cured resin layer (die thickness: 5 mm) having projections and recesses corresponding to the projections and recesses of the stamper on the surface is produced.

Further, by vapor-depositing Au in a thickness of 200 nm on the cured resin layer, the Au electrode is patterned by photolithography, and an electrode pad for lower electrode extending from the bottom surface to the side surface of each recess up to the top surface of sub-mount, and an electrode pad for upper electrode insulated from this electrode pad are formed. By cutting the cured resin layer having electrode pads by using a dicer, a plurality of sub-mounts C made of epoxy resin is formed.

Production error of projections and recesses as seen from the master substrate is within 200 nm, and sub-mounts C made of ultraviolet curable resin can be produced at high precision.

<Mounting of Module>

In the same manner as in example 1 by using sub-mount C, a two-way light transmission and reception module of example 3 having a pair of optical transmission and reception sections and macromolecular optical waveguide film is obtained.

<Evaluation of Communication Performance>

By using sampling oscilloscope (Agilent 86100C of Agilent Technologies) and pulse pattern generator, the performance of light transmission and reception is evaluated in the two-way light transmission and reception module of example 3. Excellent eye patterns can be measured in up to 3.125 Gbps.

Example 4

Example 4 is an example of producing a light transmission and reception module, which is the same as the light transmission and reception module shown in FIGS. 10A to 10C, by producing a resin-made sub-mount by the stamper method. As explained below, the light transmission and reception module is produced in the same procedure as in example 2, except that the sub-mount is produced by stamper method.

<Production of Sub-Mount>

In the same manner as in example 2, Si master substrate is produced. Using this master substrate as stamper (mold), thermoplastic bulk molding compound (BMC) resin is adhered to the stamper, and heated for 2 minutes at 250 deg. C. under pressure of 100 N, and cooled gradually, such that epoxy resin is cured. The cured layer is separated from stamper, and a cured resin layer (die thickness: 5 mm) having projections and recesses corresponding to the projections and recesses of the stamper on the surface is produced.

Further, by vapor-depositing Al on the slope of cured resin layer, and mirror surface is formed. By vapor-depositing Au in a thickness of 200 nm on the cured resin layer, the Au electrode is patterned by photolithography, and an electrode pad for lower electrode extending from the bottom surface to the side of each recess up to the top surface of sub-mount, and an electrode pad for upper electrode insulated from this electrode pad are formed. By cutting the cured resin layer forming electrode pads by using a dicer, a plurality of sub-mounts D made of epoxy resin is formed.

Production error of projections and recesses as seen from the master substrate is within 200 nm, and sub-mounts D made of ultraviolet curable resin can be produced at high precision.

<Mounting of Module>

By mounting same as in example 2 by using sub-mount D, a two-way light transmission and reception module of example 4 having a pair of optical transmission and reception sections and macromolecular optical waveguide film is obtained.

<Evaluation of Communication Performance>
By using sampling oscilloscope (Agilent 86100C of Agilent Technologies) and pulse pattern generator, the performance of light transmission and reception is evaluated in the two-way light transmission and reception module of example 4. Excellent eye patterns can be measured in up to 3.125 Gbps.

Example 5

Example 5 is an example of producing a light transmission and reception module, which is the same as the light transmission and reception module shown in FIGS. 3A to 3C, by producing a glass-made sub-mount by the stamper method. As explained below, the light transmission and reception module is produced in the same procedure as in example 3, except that the sub-mount is produced by stamper method.

<Production of Sub-Mount>
As master substrate, Ni-made die (master substrate) is cast such that it has recesses of 250 μm in depth for mounting light emitting element and light detecting element, and a notch of 50 μm in depth for mounting macromolecular optical waveguide film. Using this die as stamper (mold), low melting point glass (K-PG375 Vidron of Sumida Optical Glass Inc., Tg: 343 deg. C., yield point: 363 deg. C.) is adhered to the stamper, and heated for 5 minutes at 375 deg. C. under pressure, and cooled slowly, and the low melting point glass is cured. The cured glass layer is released from the stamper, and a cured glass layer (die thickness: 5 mm) having projections and recesses corresponding to the projections and recesses of the stamper on the surface is produced.

Further, by vapor-depositing Au in a thickness of 200 nm on the cured glass layer, the Au electrode is patterned by photolithography, and an electrode pad for lower electrode extending from the bottom surface to the side surface of each recess up to the top surface of sub-mount, and an electrode pad for upper electrode insulated from this electrode pad are formed. By cutting the cured glass layer forming electrode pads by using a dicer, a plurality of sub-mounts E made of glass are formed.

Production error of projections and recesses as seen from the master substrate is within 200 nm, and sub-mounts E made of ultraviolet curable resin can be produced at high precision.

<Mounting of Module>
By mounting in the same manner as in example 1 by using sub-mount E, a two-way light transmission and reception module of example 5 having a pair of optical transmission and reception sections and macromolecular optical waveguide film is obtained.

<Evaluation of Communication Performance>
By using sampling oscilloscope (Agilent 86100C of Agilent Technologies) and pulse pattern generator, the performance of light transmission and reception is evaluated in the two-way light transmission and reception module of example 5. Excellent eye patterns can be measured in up to 3.125 Gbps.

What is claimed is:

1. A light transmission and reception module comprising:
   a belt-shaped macromolecular optical waveguide film having an optical waveguide, the waveguide film having a first end and a second end,
   an optical transmitter having a light emitting element and a first sub-mount for holding the light emitting element, a portion of the first sub-mount forming a notch for mounting the first end of the macromolecular optical waveguide film on the first sub-mount so that a light emitted from the light emitting element may be coupled to an incident end surface of the optical waveguide, and
   an optical receiver having a light detecting element and a second sub-mount for holding the light detecting element, a portion of the second sub-mount forming a notch for mounting the second end of the macromolecular optical waveguide film on the second sub-mount so that the light emitted from an exit end surface of the optical waveguide may be received in the light detecting element,
   wherein the light emitting element and light detecting element are fixed on the first and the second sub-mounts, respectively, by using a resin that is the same as a resin composing a core of the optical waveguide.

2. The light transmission and reception module of claim 1, wherein the thickness of the macromolecular optical waveguide film is 50 mm to 200 mm.

3. The light transmission and reception module of claim 1, wherein the macromolecular optical waveguide film is a flexible transparent resin film with a bending radius tolerance of 3 mm or less.

4. The light transmission and reception module of claim 3, wherein the clad of the optical waveguide is composed of alicyclic olefin resin having norbornene configuration in the main chain, and having a polar group in the side chain.

5. The light transmission and reception module of claim 1, wherein the end portion of the macromolecular optical waveguide film is held on each sub-mount so that the film surface of the macromolecular optical waveguide may contact with the top surface of the sub-mount.

6. The light transmission and reception module of claim 1, wherein the core of the optical waveguide is copied by using a mold made of silicone resin.

7. The light transmission and reception module of claim 1, wherein the macromolecular optical waveguide film has a positioning plane to an optical path conversion mirror on each end, and is mounted at a specified position of each sub-mount by utilizing the positioning plane.

8. The light transmission and reception module of claim 1, wherein the macromolecular optical waveguide film has a positioning plane to an optical path conversion mirror on each end, and is mounted at a specified position of each sub-mount by utilizing the back surface reflection image on the optical path conversion mirror.

9. The light transmission and reception module of claim 7, wherein the optical path conversion mirror is a 45-degree mirror for changing the light propagation direction by 90 degrees.

10. The light transmission and reception module of claim 1, wherein the film surface of the macromolecular optical waveguide film is adhered to the light emitting element and/or light detecting element by using a resin that is the same as a resin composing a clad of the optical waveguide.

11. The light transmission and reception module of claim 1, wherein each sub-mount has a recess, and the light emitting element and/or light detecting element is held in the recess.

12. The light transmission and reception module of claim 1, wherein an electrode pattern for electrical wiring is formed on each sub-mount.

13. The light transmission and reception module of claim 1, wherein each sub-mount is composed of silicon.

14. The light transmission and reception module of claim 1, wherein each sub-mount is composed of quartz glass.

15. The light transmission and reception module of claim 1, wherein each sub-mount is composed of at least one metal selected from the group consisting of nickel, copper, and cobalt, or an alloy thereof.

16. A light transmission and reception module comprising:
- a belt-shaped macromolecular optical waveguide film having an optical waveguide for transmission and an optical waveguide for reception, and
- an optical transmission and reception section provided individually at each end of the macromolecular optical waveguide film,
- wherein each optical transmission and reception section includes a light emitting element, a light detecting element, and a sub-mount for holding the light emitting element and the light detecting element, and the respective optical transmission and reception sections hold the end portions of the macromolecular optical waveguide film in a portion of the respective sub-mounts forming a notch, so that the light emitted from the light emitting element is coupled to the incident end surface of the optical waveguide for transmission, and that the light emitted from the exit end surface of the optical waveguide for reception is received in the light detecting element,
- wherein the light emitting element and light detecting element are fixed on the sub-mounts, respectively, by using a resin that is the same as a resin composing a core of the optical waveguide.

17. A light transmission and reception module comprising:
- a belt-shaped macromolecular optical waveguide film having an optical waveguide, the waveguide film having a first end and a second end,
- an optical transmitter having a first sub-mount having a reflection plane for converting an optical path of incident light and a light emitting element, and
- an optical receiver having a second sub-mount having a reflection plane for converting an optical path of incident light and a light detecting element,
- wherein the light emitting element is disposed in the optical transmitter so that the first end of the macromolecular optical waveguide film is mounted on a portion of the first sub-mount forming a notch, and the light emitted from the light emitting element is coupled to the incident end surface of the optical waveguide after having an optical path thereof changed by the reflection plane, and
- the light detecting element is disposed in the optical receiver so that the second end of the macromolecular optical waveguide film is mounted on a portion of the second sub-mount forming a notch, and the light emitted from the exit end surface of the optical waveguide is received in the light detecting element after having an optical path thereof changed by the reflection plane,
- wherein each sub-mount is composed of silicon, and includes a cut section formed on the sub-mount, the cut section having a metal layer that forms the reflection plane.

18. The light transmission and reception module of claim 17, wherein the thickness of the macromolecular optical waveguide film is 50 mm to 200 mm.

19. The light transmission and reception module of claim 17, wherein the macromolecular optical waveguide film is a flexible transparent resin film with a bending radius tolerance of 3 mm or less.

20. The light transmission and reception module of claim 19, wherein the clad of the optical waveguide is composed of alicyclic olefin resin having norbornene configuration in the main chain, and having a polar group in the side chain.

21. The light transmission and reception module of claim 17, wherein the end portion of the macromolecular optical waveguide film is held on each sub-mount so that the film surface of the macromolecular optical waveguide may contact with the top surface of the sub-mount.

22. The light transmission and reception module of claim 17, wherein a core of the optical waveguide is copied by using a mold made of silicone resin.

23. The light transmission and reception module of claim 17, wherein the reflection plane is a 45-degree mirror surface for changing the light propagation direction by 90 degrees.

24. The light transmission and reception module of claim 17, wherein each sub-mount is composed of metal, and a cut section formed in the sub-mount by dicing is used as the reflection plane.

25. The light transmission and reception module of claim 24, wherein the metal is at least one metal selected from the group consisting of nickel, copper, cobalt, aluminum, and titanium, or its alloy.

26. A light transmission and reception module comprising:
- a belt-shaped macromolecular optical waveguide film having an optical waveguide, the waveguide film having a first end and a second end,
- an optical transmitter having a first sub-mount having a reflection plane for converting an optical path of incident light and a light emitting element, and
- an optical receiver having a second sub-mount having a reflection plane for converting an optical path of incident light and a light detecting element,
- wherein the light emitting element is disposed in the optical transmitter so that the first end of the macromolecular optical waveguide film is mounted on a portion of the first sub-mount forming a notch, and the light emitted from the light emitting element is coupled to the incident end surface of the optical waveguide after having an optical path thereof changed by the reflection plane,
- the light detecting element is disposed in the optical receiver so that the second end of the macromolecular optical waveguide film is mounted on a portion of the second sub-mount forming a notch, and the light emitted from the exit end surface of the optical waveguide is received in the light detecting element after having an optical path thereof changed by the reflection plane, and
- each sub-mount is composed of quartz glass, and includes a cut section formed on the sub-mount, the cut section having a metal layer that forms the reflection plane.

27. The light transmission and reception module of claim 17, wherein an electrode pattern for electrical wiring is formed on each sub-mount.

28. A light transmission and reception module comprising:
- a belt-shaped macromolecular optical waveguide film having an optical waveguide, the waveguide film having a first end and a second end,
- an optical transmitter having a first sub-mount having a reflection plane for converting an optical path of incident light and a light emitting element, and
- an optical receiver having a second sub-mount having a reflection plane for converting an optical path of incident light and a light detecting element, wherein the light emitting element is disposed in the optical transmitter so that the first end of the macromolecular optical waveguide film is mounted on a portion of the first sub-mount forming a notch, and the light emitted from the light emitting element is coupled to the incident end surface of the optical waveguide after having an optical path thereof changed by the reflection plane, the light detecting element is disposed in the optical receiver so that the second end of the macromolecular optical waveguide film is mounted on a portion of the second sub-mount forming a notch, and the light emitted from the exit end surface of the optical waveguide is received in the light detecting element after having an optical path thereof changed by the reflection plane, and the light emitting element and light detecting element are fixed on the first and the second sub-mounts, respectively, by using a resin that is the same as a resin composing a core of the optical waveguide.

29. A light transmission and reception module comprising:

a belt-shaped macromolecular optical waveguide film having an optical waveguide for transmission and an optical waveguide for reception, and an optical transmission and reception section including a first sub-mount and a second sub-mount having a reflection plane for changing the optical path of incident light, a light emitting element, and a light detecting element, wherein the optical transmission and reception section is disposed at each of a first end and a second end of the macromolecular optical waveguide film, one optical transmission and reception section holds the first end portion of the macromolecular optical waveguide film in a first notch formed on the first sub-mount, has the light emitting element disposed thereon so that the light emitted from the light emitting element is coupled to the incident end surface of the optical waveguide for transmission after having an optical path thereof changed by the reflection plane, and the other optical transmission and reception section holds the second end portion of the macromolecular optical waveguide film in a second notch formed on the second sub-mount, has the light detecting element disposed thereon so that the light emitted from the exit end surface of the optical waveguide for reception is received by the light detecting element after having an optical path thereof changed by the reflection plane, and each sub-mount is composed of silicon, and includes a cut section formed on the sub-mount, the cut section having a metal layer that forms the reflection plane.

* * * * *